(12) United States Patent
Kawahito et al.

(10) Patent No.: US 12,535,591 B2
(45) Date of Patent: Jan. 27, 2026

(54) DISTANCE IMAGE CAPTURING DEVICE AND METHOD FOR CAPTURING DISTANCE IMAGE

(71) Applicant: TOPPAN INC., Tokyo (JP)

(72) Inventors: Shoji Kawahito, Hamamatsu (JP); Juyeong Kim, Hamamatsu (JP)

(73) Assignee: TOPPAN INC., Tokyo (JP)

( * ) Notice: Subject to any disclaimer, the term of this patent is extended or adjusted under 35 U.S.C. 154(b) by 217 days.

(21) Appl. No.: 18/359,581

(22) Filed: Jul. 26, 2023

(65) Prior Publication Data

US 2023/0367019 A1    Nov. 16, 2023

Related U.S. Application Data

(63) Continuation of application No. PCT/JP2022/003139, filed on Jan. 27, 2022.

(30) Foreign Application Priority Data

Jan. 28, 2021    (JP) .................. 2021-012227

(51) Int. Cl.
| | |
|---|---|
| *G01S 17/894* | (2020.01) |
| *G01S 7/4863* | (2020.01) |
| *H04N 23/56* | (2023.01) |
| *H04N 25/77* | (2023.01) |
| *H04N 25/78* | (2023.01) |

(52) U.S. Cl.
CPC .......... *G01S 17/894* (2020.01); *G01S 7/4863* (2013.01); *H04N 23/56* (2023.01); *H04N 25/77* (2023.01); *H04N 25/78* (2023.01)

(58) Field of Classification Search
CPC .... G01S 17/894; G01S 7/4863; G01S 7/4865; H04N 23/56; H04N 25/77; H04N 25/78
See application file for complete search history.

(56) References Cited

U.S. PATENT DOCUMENTS

| | | | |
|---|---|---|---|
| 2015/0130904 A1* | 5/2015 | Bae .................. | G01S 17/894 |
| | | | 348/46 |
| 2017/0242126 A1 | 8/2017 | Matsuo et al. | |
| | (Continued) | | |

FOREIGN PATENT DOCUMENTS

| | | |
|---|---|---|
| JP | 06-066940 | 3/1994 |
| JP | 07-191144 | 7/1995 |
| | (Continued) | |

OTHER PUBLICATIONS

Yusuke Yada; "Distance image generation device and distance image generation method" -JP2014163717 (A) (Year: 2014).*

(Continued)

*Primary Examiner* — Marly S Camargo
(74) *Attorney, Agent, or Firm* — STAAS & HALSEY LLP

(57) ABSTRACT

A distance image capturing device includes a light source, a photodiode configured to generate a charge corresponding to received light, and a peripheral circuit configured to control an operation of the pixel circuit unit, in which the peripheral circuit generates a first transfer control pulse and a second transfer control pulse based on the magnitude relationship between a first charge amount accumulated in a first floating diffusion unit and a second charge amount accumulated in a second floating diffusion unit.

14 Claims, 18 Drawing Sheets

(56) References Cited

U.S. PATENT DOCUMENTS

| | | | | |
|---|---|---|---|---|
| 2019/0033070 A1* | 1/2019 | Murakami | ............. | G01S 17/89 |
| 2020/0243585 A1 | 7/2020 | Kawahito | | |
| 2020/0278194 A1 | 9/2020 | Kawahito | | |
| 2021/0356568 A1* | 11/2021 | Hurwitz | ................ | G01S 7/4865 |
| 2022/0268942 A1* | 8/2022 | Kaizu | .................. | G01S 7/4865 |
| 2023/0194678 A1* | 6/2023 | Kawahito | ............. | G01S 17/894 |
| 2024/0276112 A1* | 8/2024 | Jin | ....................... | H04N 25/771 |

FOREIGN PATENT DOCUMENTS

| | | |
|---|---|---|
| JP | 08-313631 | 11/1996 |
| JP | 2008-076390 | 4/2008 |
| JP | 2014-163717 | 9/2014 |
| JP | 2016-090436 | 5/2016 |
| JP | 2019-082331 | 5/2019 |
| WO | WO 2016/133053 A1 | 8/2016 |
| WO | WO2016/075885 | 8/2017 |
| WO | WO 2019/031510 A1 | 2/2019 |
| WO | WO 2019/078366 A1 | 4/2019 |

OTHER PUBLICATIONS

International Search Report issued in International Application No. PCT/JP2022/003139 dated Mar. 8, 2022.

\* cited by examiner

FIG. 4
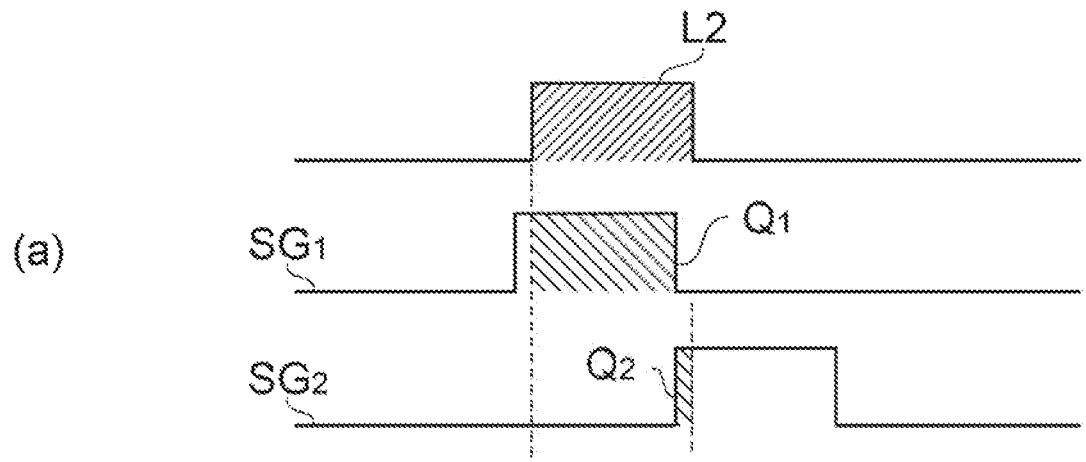
(a)
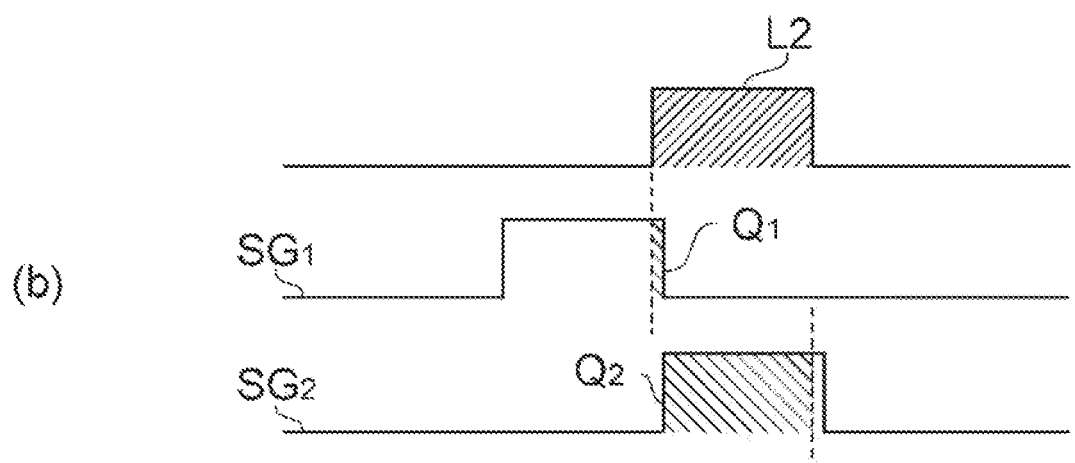
(b)

FIG. 6
(a)
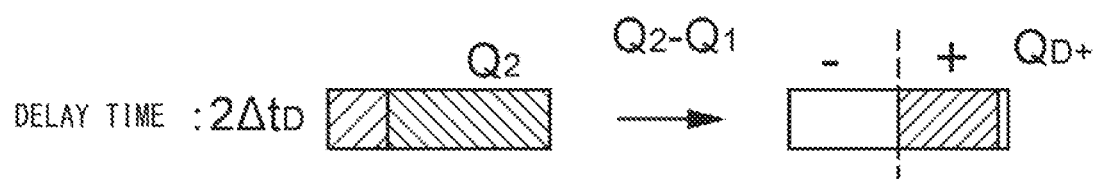
(b)
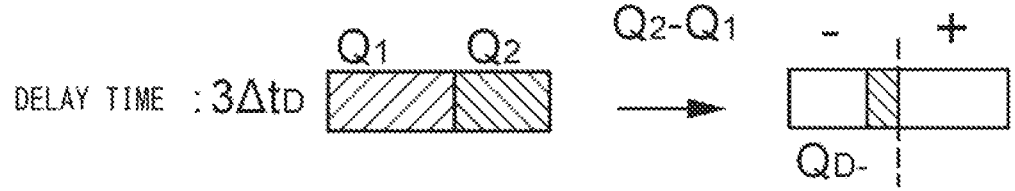

FIG. 9
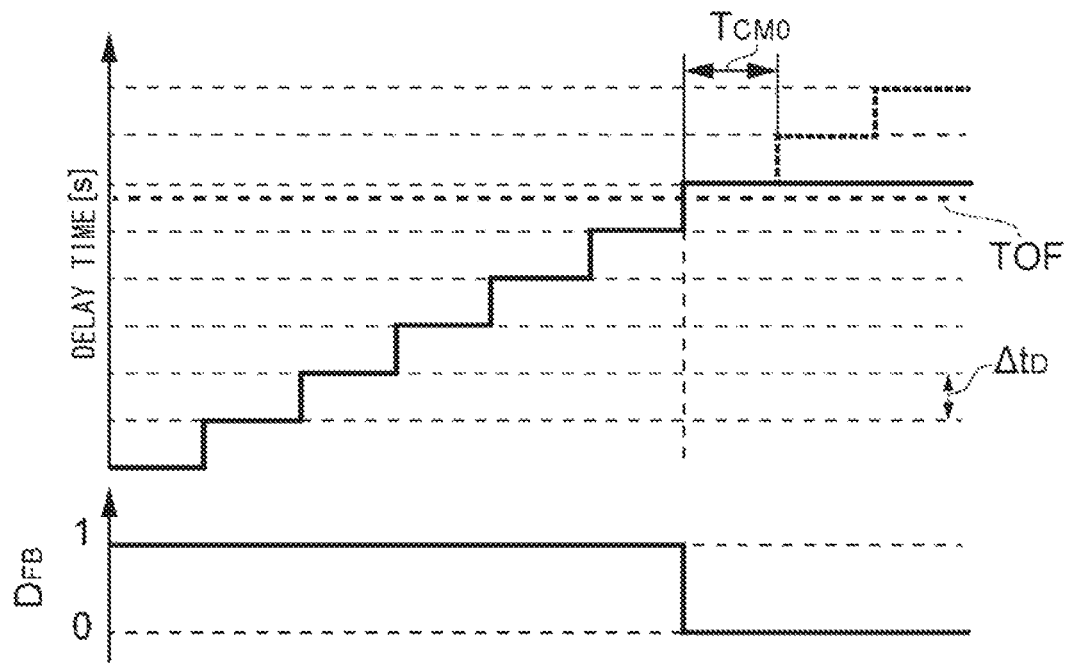
(a)
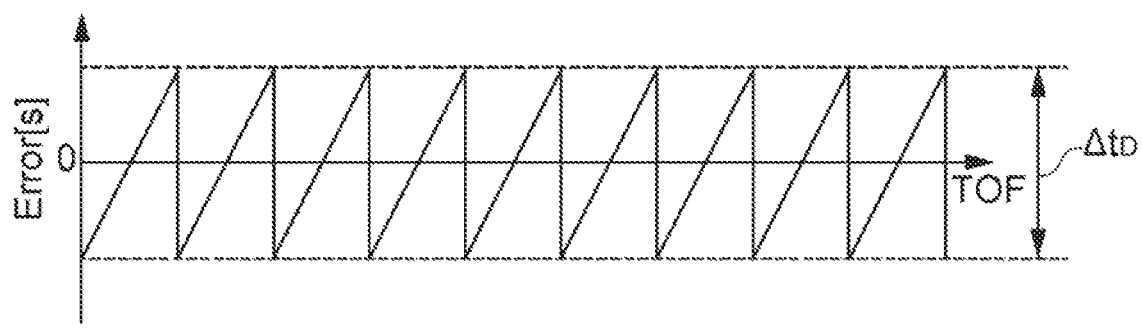
(b)

FIG. 13
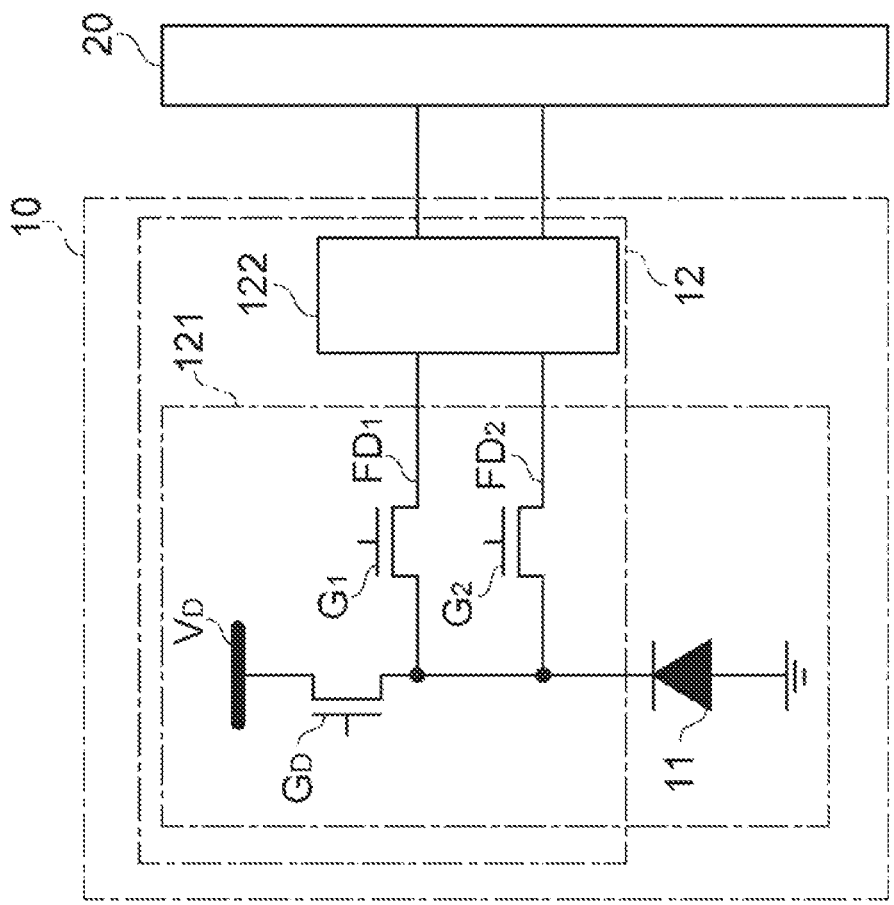
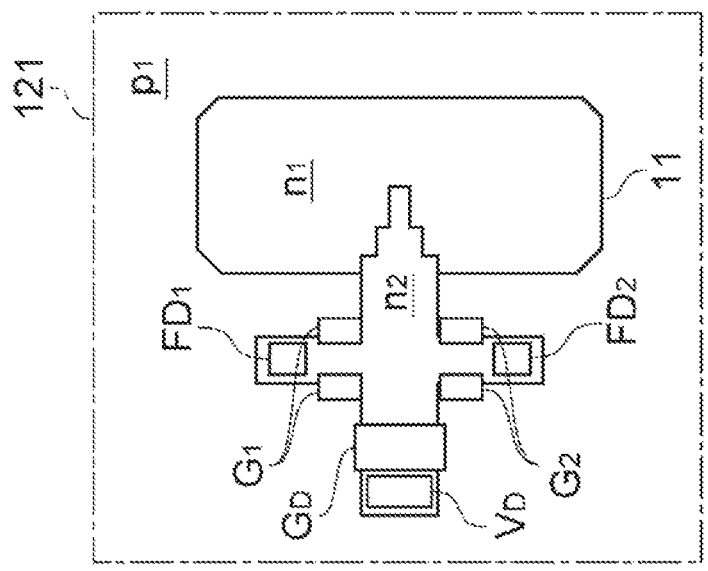

DISTANCE IMAGE CAPTURING DEVICE AND METHOD FOR CAPTURING DISTANCE IMAGE

CROSS REFERENCE TO RELATED APPLICATIONS

This application is a continuation application based on PCT International Patent Application No. PCT/JP2022/003139, filed on Jan. 27, 2022, which claims priority to Japanese Patent Application No. 2021-012227, filed on Jan. 28, 2021, in the Japan Patent Office. The contents of both the Japanese Patent Application and the PCT Application are incorporated herein by reference.

FIELD OF THE INVENTION

The present invention relates to a distance image capturing device and a method for capturing a distance image.

DESCRIPTION OF RELATED ART

The distance image capturing device outputs a distance image. The distance image has distance information to an image capturing target object. The distance image capturing device emits measurement light to an image capturing target object. The measurement light is reflected by the image capturing target object, and then incident on the distance image capturing device again. When the timing at which the measurement light is emitted and the timing at which the reflected light from the image capturing target object is incident are used, the time required for the measurement light to reach the image capturing target object from the distance image capturing device can be known. The time is also referred to as a light flight time. When the light flight time and the speed of light are used, the distance from the distance image capturing device to the image capturing target object can be found. Such a method of measuring the distance is referred to as a time-of-flight measurement method. A distance image measurement device based on a time-of-flight measurement method is also referred to as a TOF sensor. Japanese Unexamined Patent Application, First Publication No. 2019-082331, Japanese Unexamined Patent Application, First Publication No. 2016-090436, Republished Japanese Translation No. 2016-075885 of the PCT International Publication for Patent Applications, Japanese Unexamined Patent Application, First Publication No. 2008-076390, and Japanese Unexamined Patent Application, First Publication No. H06-066940 disclose a technology related to the TOF sensor.

The TOF sensor includes a so-called direct TOF sensor and an indirect TOF sensor. The direct TOF sensor directly measures the light flight time. For example, Japanese Unexamined Patent Application, First Publication No. H07-191144 and Japanese Unexamined Patent Application, First Publication No. H08-313631 disclose technologies related to the direct TOF sensor. The indirect TOF sensor distributes the charge generated by the reflected light to a plurality of areas over time. Then, the indirect TOF sensor obtains the light flight time by using the ratio of the charges accumulated for each area. For example, PCT International Publication No. WO 2019/078366, PCT International Publication No. WO 2019/031510, and PCT International Publication No. WO 2016/133053 disclose technologies related to the indirect TOF sensor. The indirect TOF sensor has some advantages in which a pixel size can be reduced, a circuit can be simplified, and distance resolution is high, as compared with the direct TOF sensor.

Examples of the index showing the performance of the indirect TOF sensor include distance resolution, linearity between the distance and an output signal, or the like. In the technical field of the indirect TOF sensor, it is desired to improve comprehensive performance including indexes such as resolution and linearity. For example, in order to increase distance resolution, the irradiation time of the measurement light may be shortened. That is, the measurement target object may be irradiated with short pulsed measurement light. Using shorter pulses is effective for improving the distance resolution. However, nonlinearity of a pixel source follower amplifier, distortion of the waveform of an optical pulse, a finite optical carrier response time in a photodiode, distortion of a transfer control pulse for demodulation, skew of a transfer control pulse, or the like becomes problems to be solved. As a result, linearity may be impaired. That is, when an attempt is made to improve one characteristic, another characteristic may be decreased. Therefore, the inventors of the present invention have examined a technology capable of comprehensively improving the performance of the indirect TOF sensor.

The present invention provides a distance image capturing device capable of improving comprehensive performance and a method for capturing a distance image.

SUMMARY OF INVENTION

According to an aspect of the present invention, a distance image capturing device includes a light source configured to generate pulse light, a pixel circuit unit array that includes a plurality of pixel circuit units configured to generate a charge corresponding to received light, and a peripheral circuit configured to provide the pixel circuit unit array with a transfer control pulse that controls an operation of the pixel circuit unit array. The pixel circuit unit includes a photoelectric conversion area for converting light into the charge, a first charge readout area for accumulating the charge transferred from the photoelectric conversion area as a first charge, a first control electrode that receives a first transfer control pulse that controls transfer of the charge from the photoelectric conversion area to the first charge readout area, a second charge readout area for accumulating the charge transferred from the photoelectric conversion area as a second charge, and a second control electrode that receives a second transfer control pulse that controls transfer of the charge from the photoelectric conversion area to the second charge readout area. The peripheral circuit generates the first transfer control pulse and the second transfer control pulse based on the magnitude relationship between the amount of the first charge accumulated in the first charge readout area and the amount of the second charge accumulated in the second charge readout area.

The distance image capturing device controls a tuning of the transfer control pulse based on a calculated value obtained from a difference in the charge amount related to a light flight time. As a result, it is possible to reduce the bias of the charge amount for each charge readout area. Therefore, the comprehensive performance of the distance image capturing device is improved.

The peripheral circuit may include a first calculation unit that outputs a calculated value related to a difference between a first voltage based on the first charge and a second voltage based on the second charge, and a second calculation unit that determines a delay time for determining a timing to output the first transfer control pulse and the second transfer control pulse by using the calculated value. The peripheral circuit may repeat an accumulation operation of accumulating the first charge and the second charge, an operation of the first calculation unit, and an operation of the second calculation unit. The configuration also makes it possible to reduce the bias of the charge amount for each charge readout area. As a result, the comprehensive performance of the distance image capturing device is improved.

In an n-th operation of the second calculation unit, the second calculation unit may determine, when the calculated value is first information, a delay time further delayed by a unit delay time from an n-th delay time used for an n-th accumulation operation as an (n+1)-th delay time used for an (n+1)-th accumulation operation. According to the operation, the bias of the charge amount can be suppressed.

The second calculation unit may include a counter that performs an operation of adding 1 to a control variable when the calculated value is first information in an n-th operation of the second calculation unit, and a delay time determination unit that determines a value obtained by multiplying the control variable by a unit delay time as an (n+1)-th delay time used for an (n+1)-th accumulation operation. According to the configuration, the bias of the charge amount can be suppressed.

The first calculation unit may output the difference between the first voltage and the second voltage as a differential voltage, and then obtain, as an integrated value of an m-th differential voltage, a result obtained by adding the m-th differential voltage to an integrated value of first to (m−1)-th differential voltages. The second calculation unit may determine, when an m-th integrated value is second information, an (n+1)-th delay time used for an (n+1)-th accumulation operation as a first delay time, and determine, when the m-th integrated value is first information, the (m+1)-th delay time as a second delay time. According to the operation, the light flight time in which an error attributed to a unit delay time is suppressed can be obtained.

The first calculation unit may include an integrator that obtains, as an m-th integrated value, a result obtained by adding an m-th differential voltage to an integrated value of the first to (m−1)-th differential voltages. The second calculation unit may include a delay time determination unit that determines, when the m-th integrated value is second information, a first delay time as the (m+1)-th delay time and determines, when the m-th integrated value is first information, a second delay time as the (m+1)-th delay time. According to the configuration, the light flight time in which an error attributed to a unit delay time is suppressed can be obtained.

The distance image capturing device may further include an A/D converter configured to convert the calculated value output by the first calculation unit into a digital signal, output the digital signal to the second calculation unit, and constitute a Delta Sigma modulator in cooperation with the first calculation unit and the second calculation unit, and a decimation filter configured to, each time the accumulation operation, the operation of the first calculation unit, the operation of the A/D converter, and an operation of the second calculation unit are repeated, receive the digital signal output by the A/D converter and perform low-pass filter processing and downsampling on the digital signal.

The decimation filter may have an oversampling ratio of the low-pass filter processing, which is an integer greater than $2^{B-1}$ and smaller than $2^B$. B may be a minimum number of bits configured to represent an oversampling ratio.

The peripheral circuit may perform a first measurement that repeats processing including the accumulation operation of accumulating the first charge and the second charge, and an operation in which in an n-th operation of the second calculation unit, the second calculation unit determines, when the calculated value is first information, a delay time further delayed by a unit delay time from an n-th delay time used for an n-th accumulation operation as an (n+1)-th delay time used for an (n+1)-th accumulation operation, and a second measurement that repeats processing including the accumulation operation, an operation in which the first calculation unit outputs the difference between the first voltage and the second voltage as a differential voltage, and then obtains, as an integrated value of an m-th differential voltage, a result obtained by adding the m-th differential voltage to an integrated value of first to (m−1)-th differential voltages, and an operation in which the second calculation unit determines, when an m-th integrated value is second information, a first delay time as an (m+1)-th delay time and determines, when the m-th integrated value is first information, a second delay time as the (m+1)-th delay time. According to a loop caused by the operation, the approximate light flight time can be measured in the first measurement. The result of the first measurement can be used to precisely measure the light flight time in the second measurement.

The first calculation unit may include an integrator that obtains a result obtained by adding the m-th differential voltage to an integrated value of the first to (m−1)-th differential voltages. The second calculation unit may include a counter that performs an operation of adding 1 to a control variable when the calculated value is first information in an n-th operation of the second calculation unit, and a delay time determination unit that selectively executes an operation of determining a value obtained by multiplying the control variable by a unit delay time as the (n+1)-th delay time used for the (n+1)-th accumulation operation, or an operation of determining, when an m-th integrated value is second information, a first delay time as the (m+1)-th delay time and determining, when the m-th integrated value is first information, a second delay time as the (m+1)-th delay time. According to a loop caused by the configuration, the approximate light flight time can be measured in the first measurement. The result of the first measurement can be used to precisely measure the light flight time in the second measurement.

The first calculation unit may include a differential amplifier that outputs the difference between the first voltage and the second voltage as a differential voltage. The differential amplifier may include a calculation amplifier having a first input end, a second input end, a third input end, a first output end, and a second output end, a feedback capacitor that receives the first charge from the first charge readout area and is connected to the first input end and the first output end, a feedback capacitor that receives the second charge from the second charge readout area and is connected to the second input end and the second output end, and a common mode feedback control unit that is connected to the third input end, the first output end, and the second output end and provides a signal to the third input end such that a difference between an output value from the first output end and an output value from the second output end is equal to a common voltage.

A method for capturing a distance image by using a distance image capturing device, which is another aspect of the present invention, includes a charge accumulation step of accumulating a first charge in a first charge readout area based on the first transfer control pulse given to a first control electrode and accumulating a second charge in a second charge readout area based on the second transfer control pulse given to a second control electrode, and a pulse generation step of generating the first transfer control pulse and the second transfer control pulse based on the magnitude relationship between the amount of the first charge and the amount of the second charge.

According to the method for capturing a distance image, a timing of the transfer control pulse is controlled based on a calculated value obtained from a difference in a charge amount related to a light flight time. As a result, it is possible to reduce the bias of the charge amount for each charge readout area. Therefore, the comprehensive performance of the method for capturing a distance image by using the distance image capturing device is improved.

The pulse generation step may include a calculation step of outputting a calculated value related to a difference between a first voltage based on the first charge and a second voltage based on the second charge, and a delay time determination step of determining a delay time to determine a tuning for outputting the first transfer control pulse and the second transfer control pulse by using the calculated value. The charge accumulation step and the pulse generation step may be repeated. According to the method, the bias of the charge amount can be suppressed.

The delay time determination step may include a step of determining in an n-th calculation step, when the calculated value is first information, a delay time further delayed by a unit delay time from an n-th delay time used for an n-th charge accumulation step as an (n+1)-th delay time used for an (n+1)-th charge accumulation step. According to the method, the bias of the charge amount can be suppressed.

The delay time determination step may include a step of outputting the difference between the first voltage and the second voltage as a differential voltage, and then obtaining, as an integrated value of an m-th differential voltage, a result obtained by adding the m-th differential voltage to an integrated value of first to (m−1)-th differential voltages, and a step of determining, when an m-th integrated value is second information, an (m+1)-th delay time used for the (m+1)-th charge accumulation step as a first delay time, and determining, when the m-th integrated value is first information, the (m+1)-th delay time as a second delay time. According to the method, the light flight time in which an error attributed to a unit delay time is suppressed can be obtained.

The delay time determination step may include a step of determining in an n-th calculation step, when the calculated value is first information, a delay time further delayed by a unit delay time from an n-th delay time used for an n-th charge accumulation step as an (n+1)-th delay time used for an (n+1)-th charge accumulation step, a step of outputting the difference between the first voltage and the second voltage as a differential voltage, and then obtaining, as an integrated value of an m-th differential voltage, a result obtained by adding the m-th differential voltage to an integrated value of first to (m−1)-th differential voltages, and a step of determining, when an m-th integrated value is second information, an (m+1)-th delay time used for the (m+1)-th charge accumulation step as a first delay time, and, when the m-th integrated value is first information, the (m+1)-th delay time is set as a second delay time. According to a loop according to the method, an approximate light flight time can be measured, and a precise light flight time can be measured based on the result.

The distance image capturing device and the method for capturing a distance image of the present invention can improve comprehensive performance.

Part (a) and part (b) of FIG. 4 are diagrams describing problems caused by measurement of a light flight time.

Figure 5:
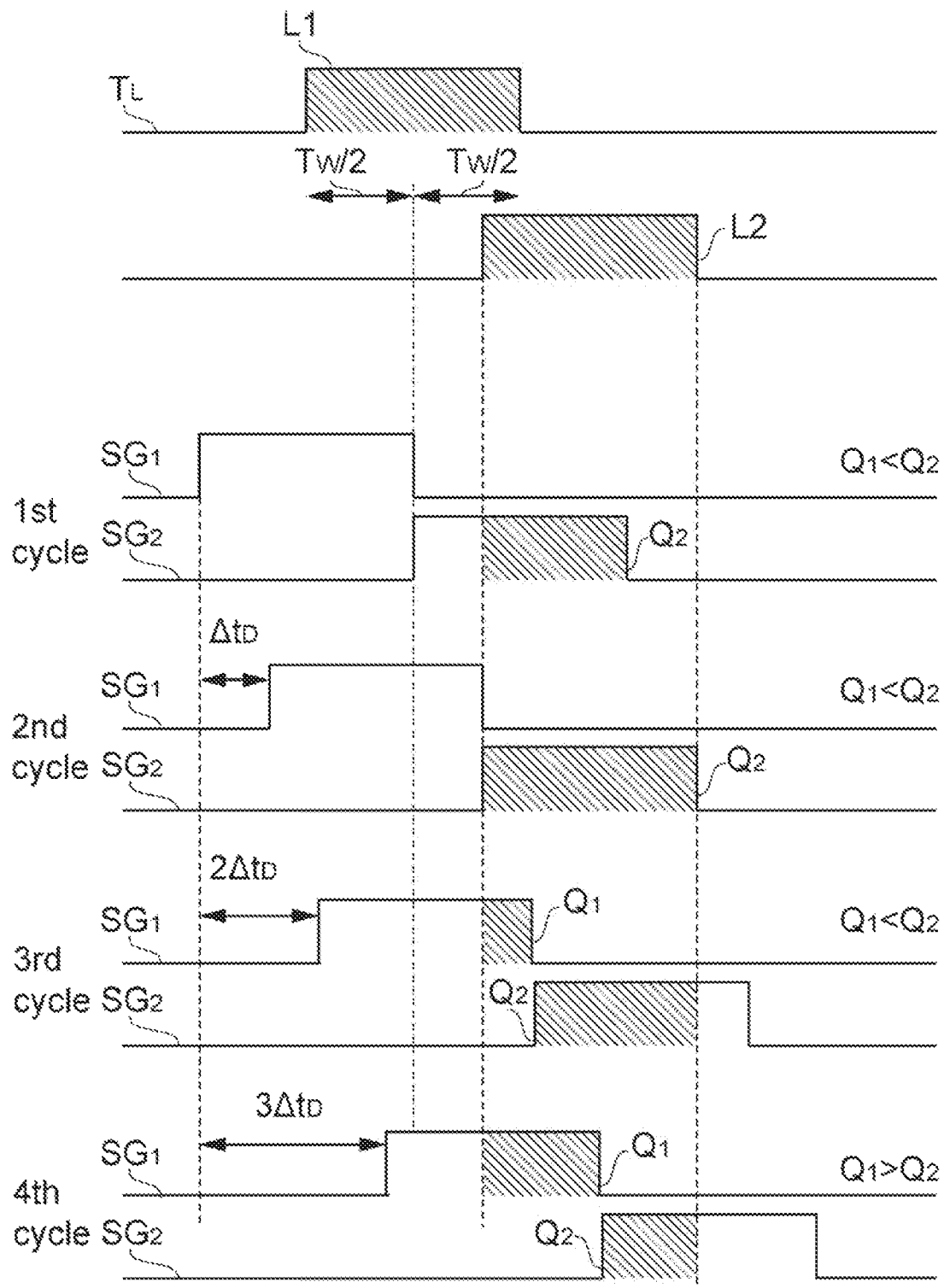

FIG. 5 is a diagram describing C measurement.

Part (a) and part (b) of FIG. 6 are diagrams conceptually showing a change in a unit delay time.

Figure 7:
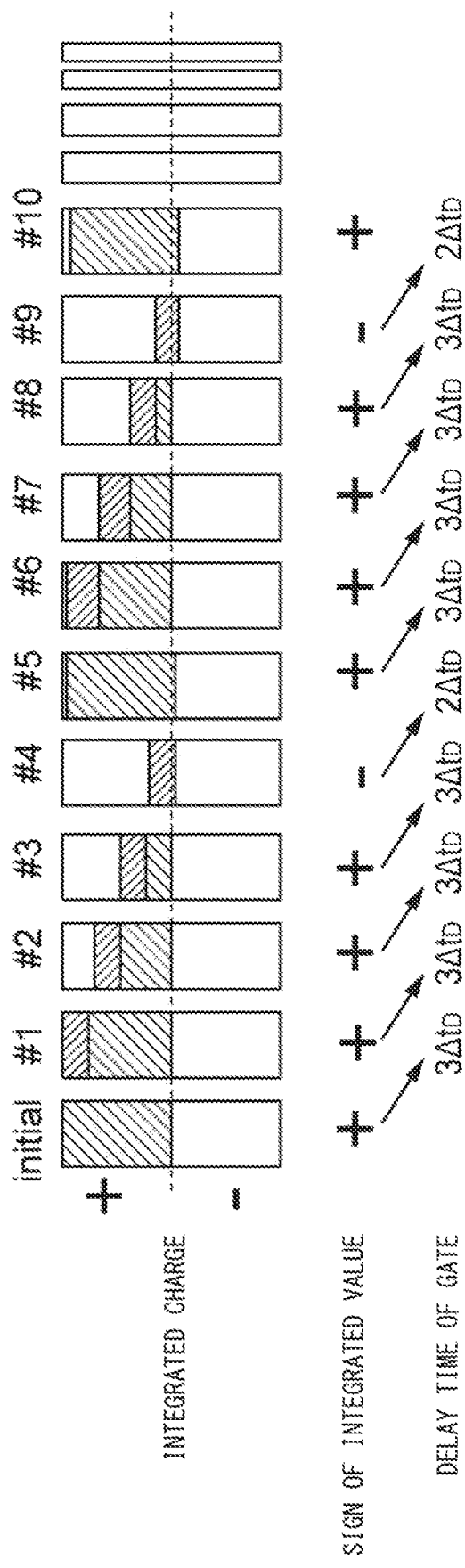

FIG. 7 is a diagram showing a transition between the number of exposure operations and an integrated value of a difference in charges.

Figure 8:
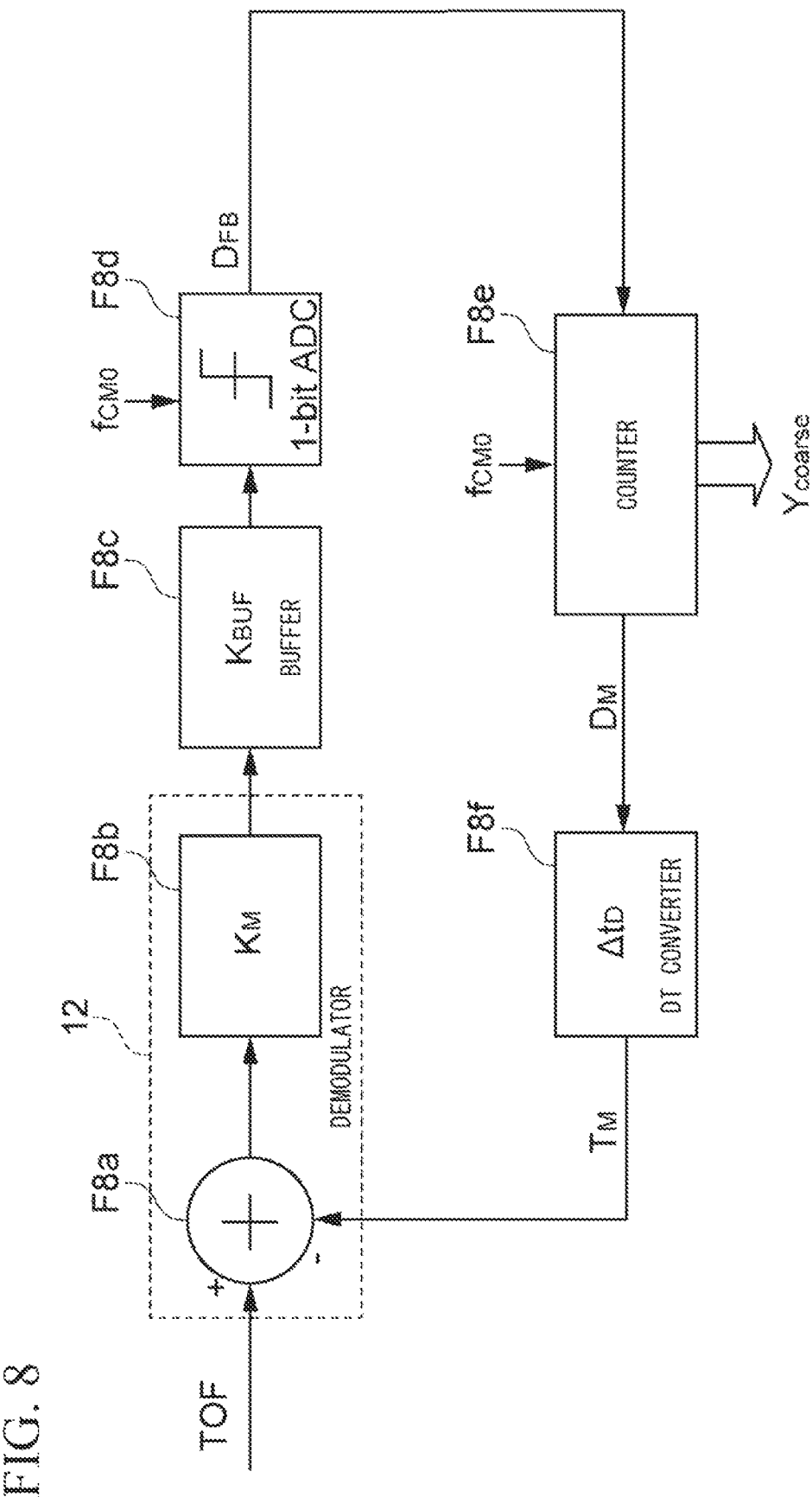

FIG. 8 is an equivalent block diagram of a configuration in which the C measurement is performed.

Part (a) of FIG. 9 is a diagram conceptually describing an operation of the C measurement. Part (b) of FIG. 9 is a diagram conceptually showing a quantization error.

Figure 10:
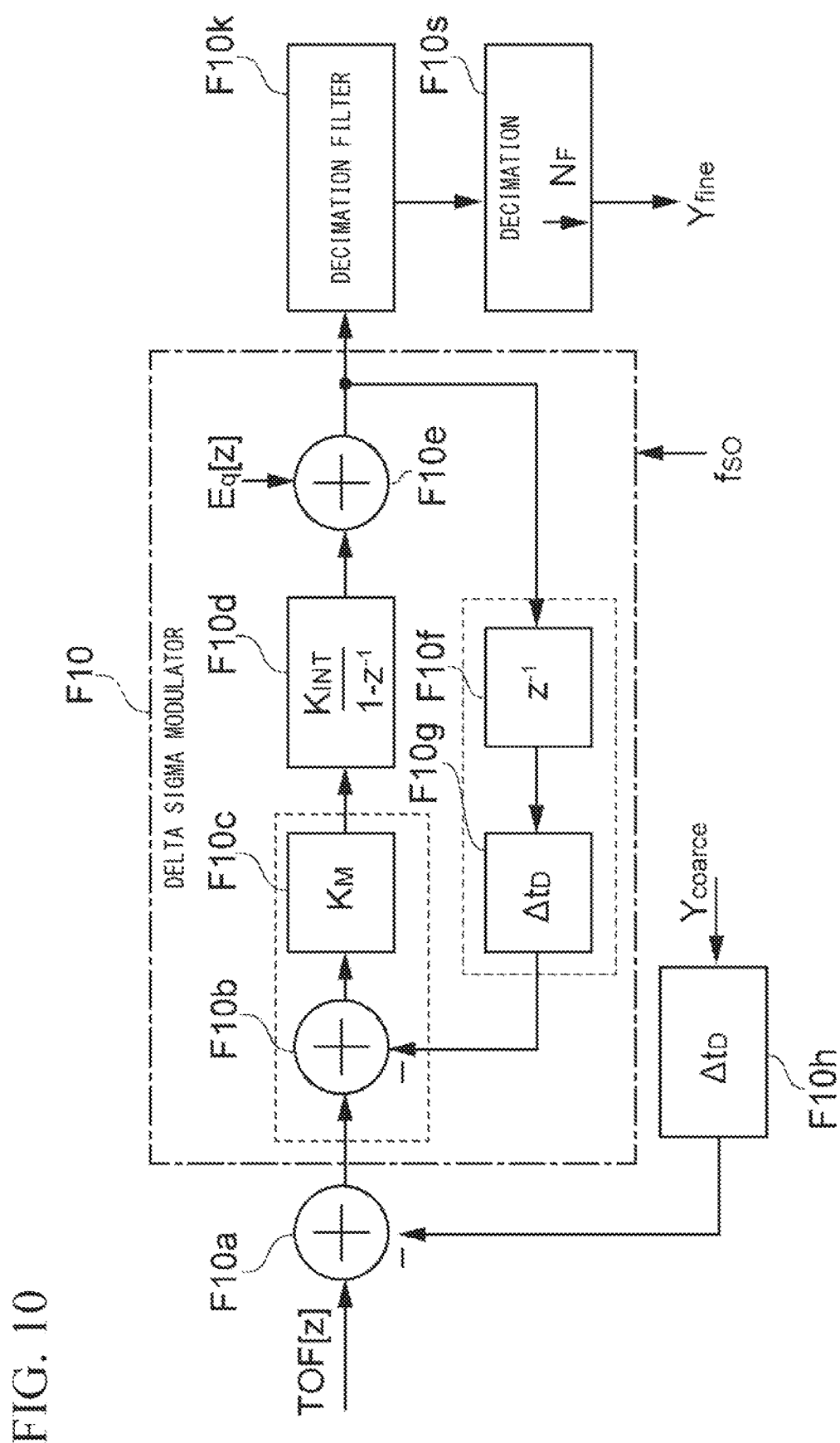

FIG. 10 is an equivalent block diagram of a configuration in which F measurement is performed.

Figure 11:
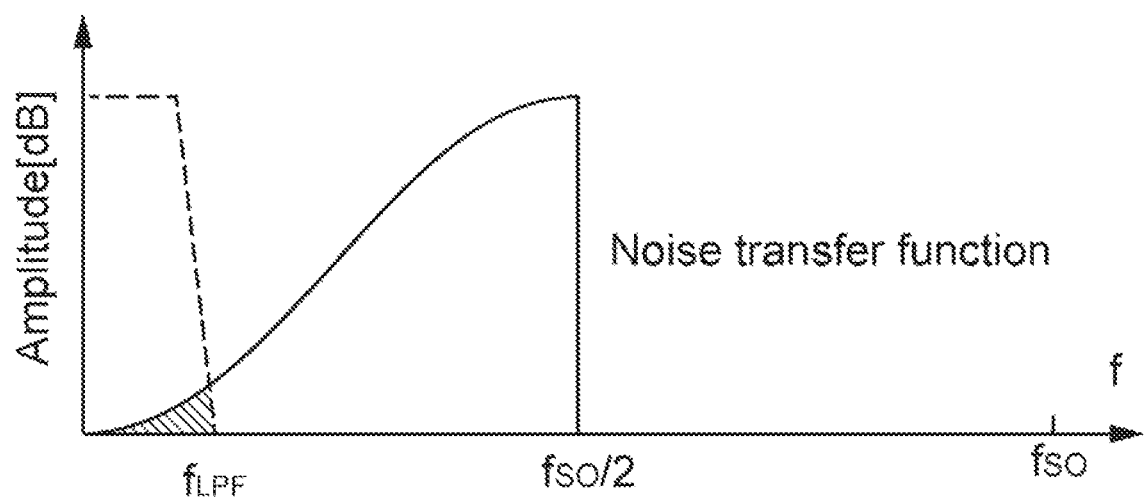

FIG. 11 is a diagram showing a form of a quantization error due to a noise transfer function.

Figure 12:
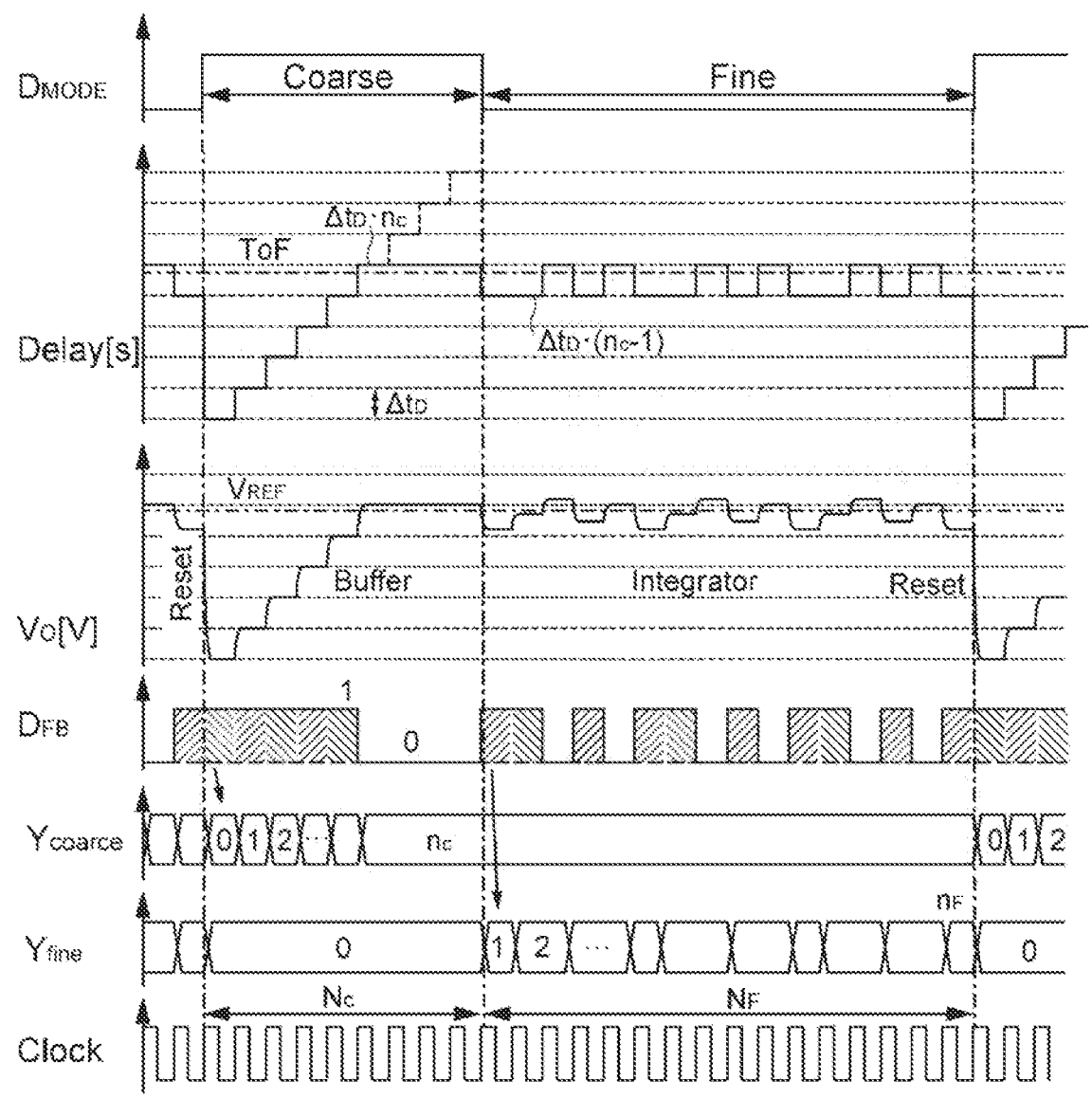

FIG. 12 is a timing chart collectively showing the C measurement and the F measurement.

FIG. 13 is diagrams showing a configuration of a pixel circuit unit.

Figure 14:
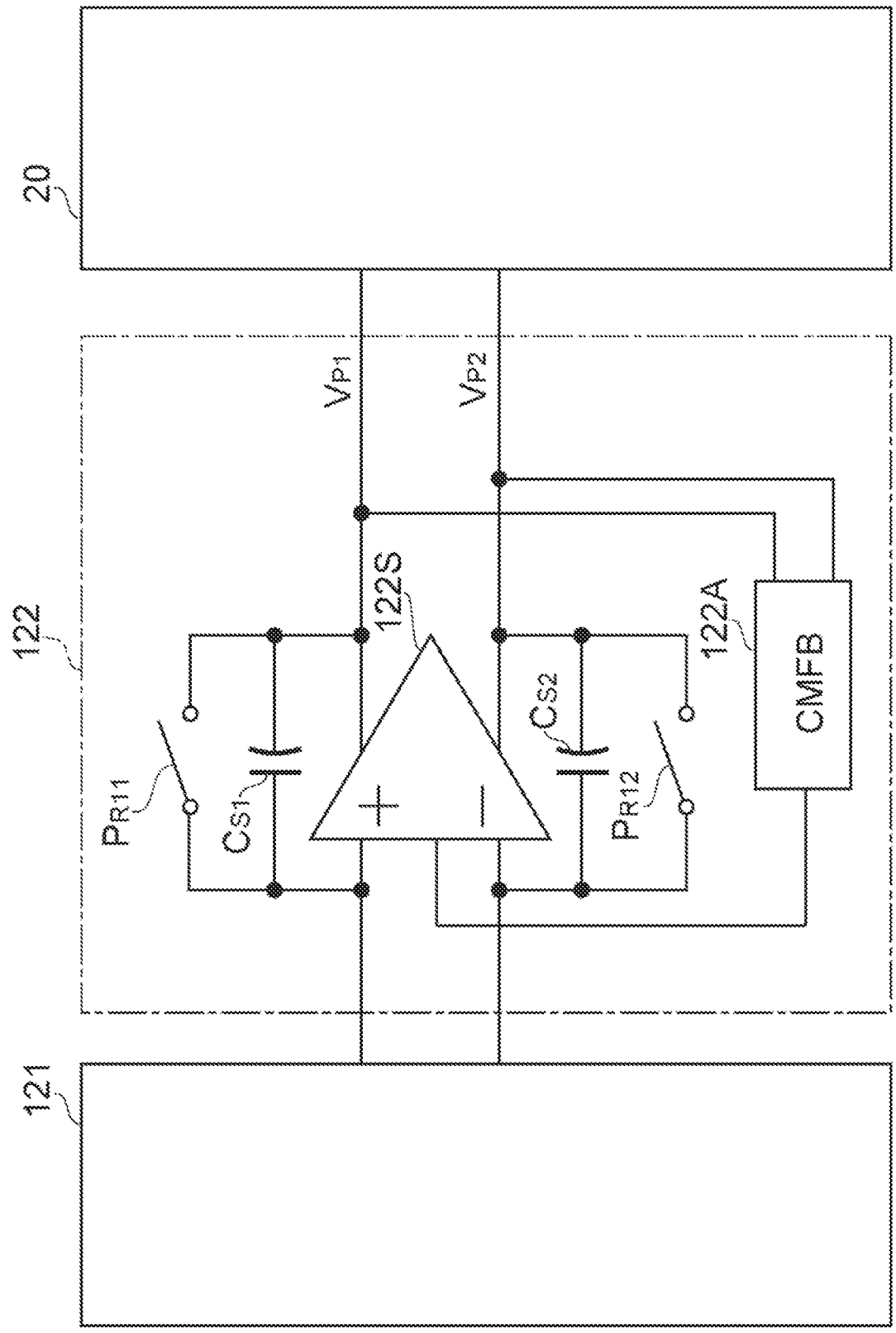

FIG. 14 is a diagram showing a circuit configuration of a front stage amplifier.

Figure 15:
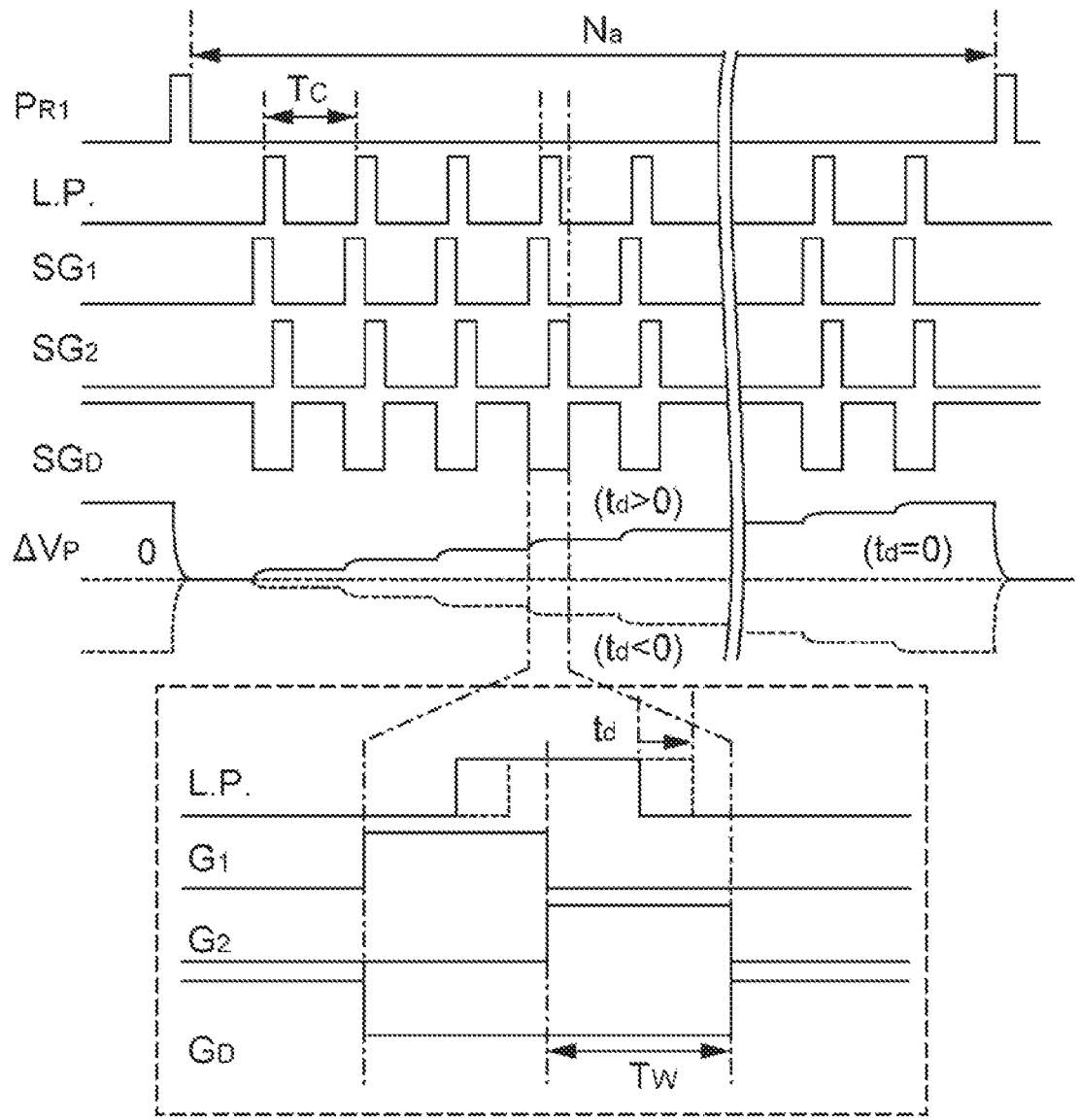

FIG. 15 is a timing chart showing operations of the pixel circuit unit and a demodulator.

Figure 16:
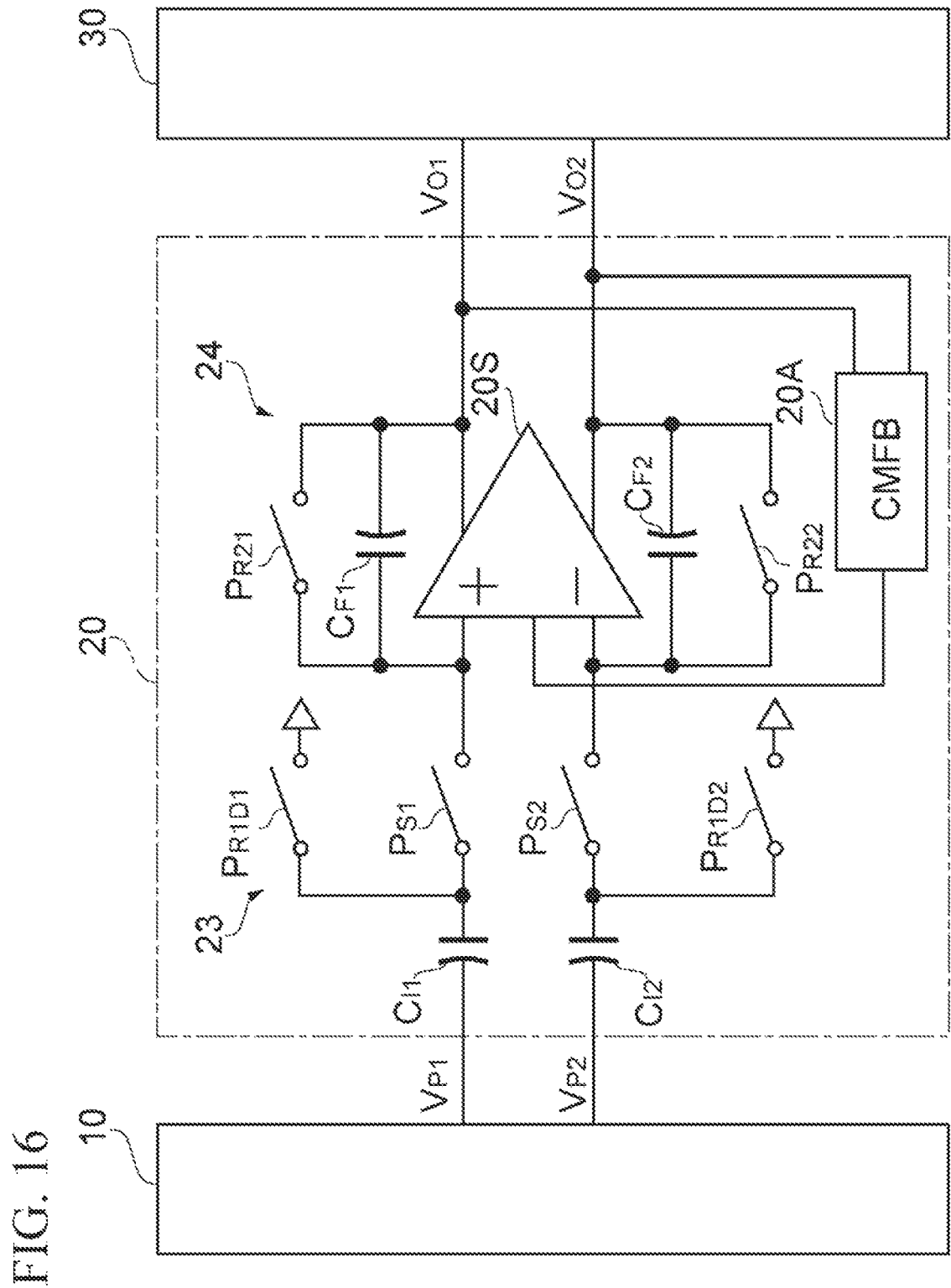

FIG. 16 is a diagram showing a circuit configuration of an analog processing unit.

Figure 17:
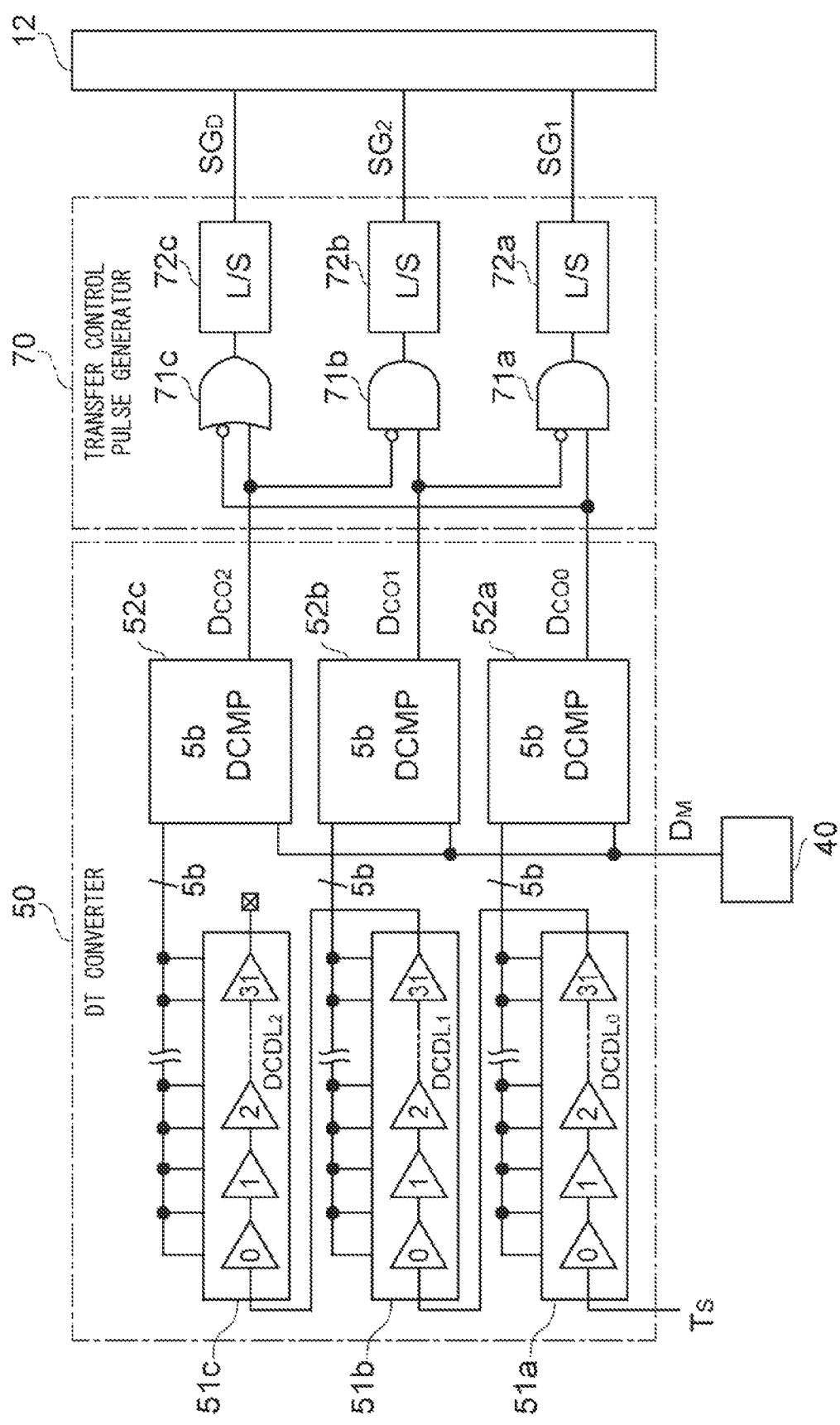

FIG. 17 is a diagram showing a circuit configuration of a DT converter and a transfer control pulse generator.

Figure 18:
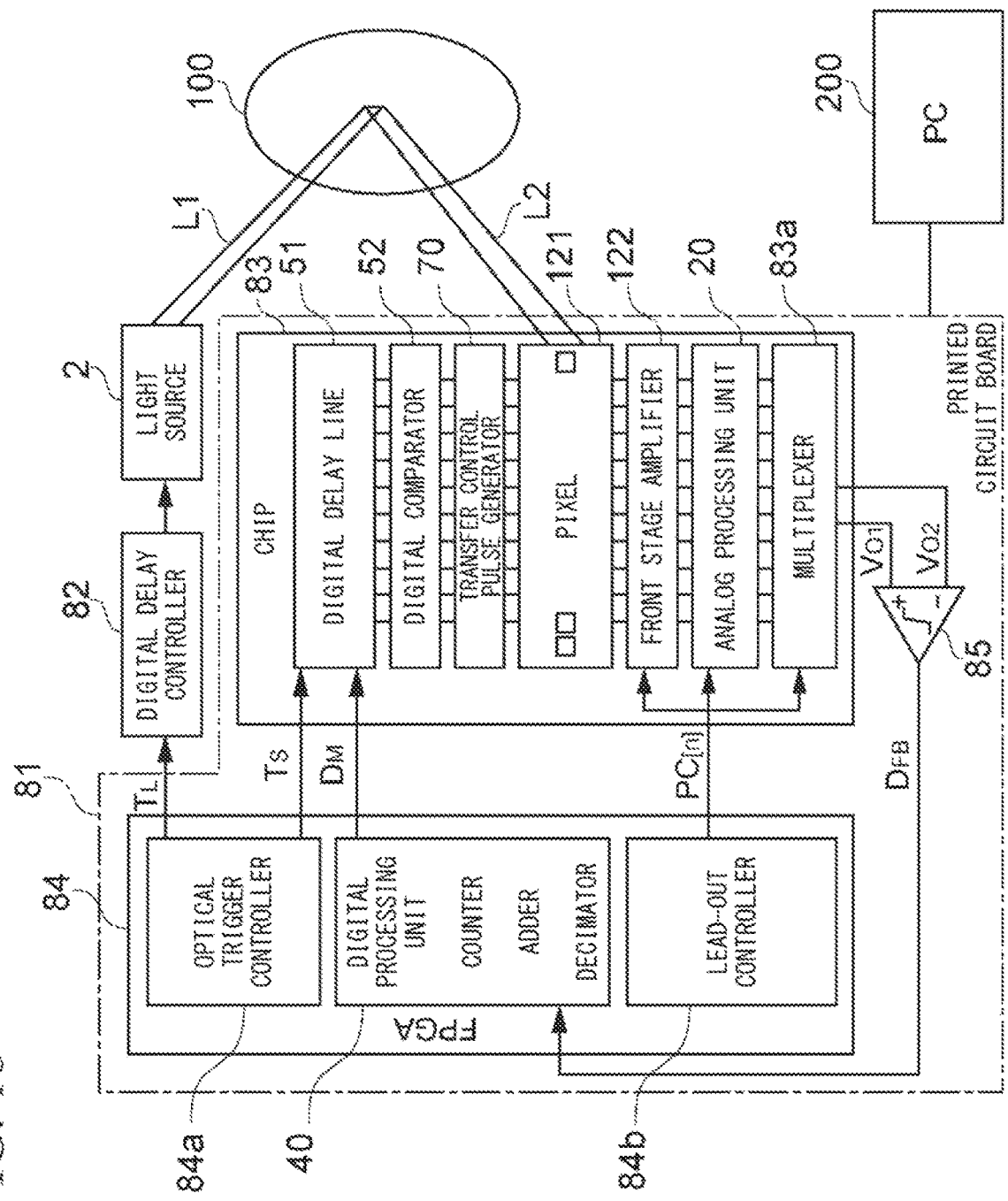

FIG. 18 is a diagram showing a specific example of a distance image capturing device.

DETAILED DESCRIPTION OF THE PREFERRED EMBODIMENTS

Hereinafter, embodiments for carrying out the present invention will be described in detail with reference to the accompanying drawings. In the description of the drawings, the same element will be given the same reference numeral, and a redundant description thereof will be omitted.

Figure 1:
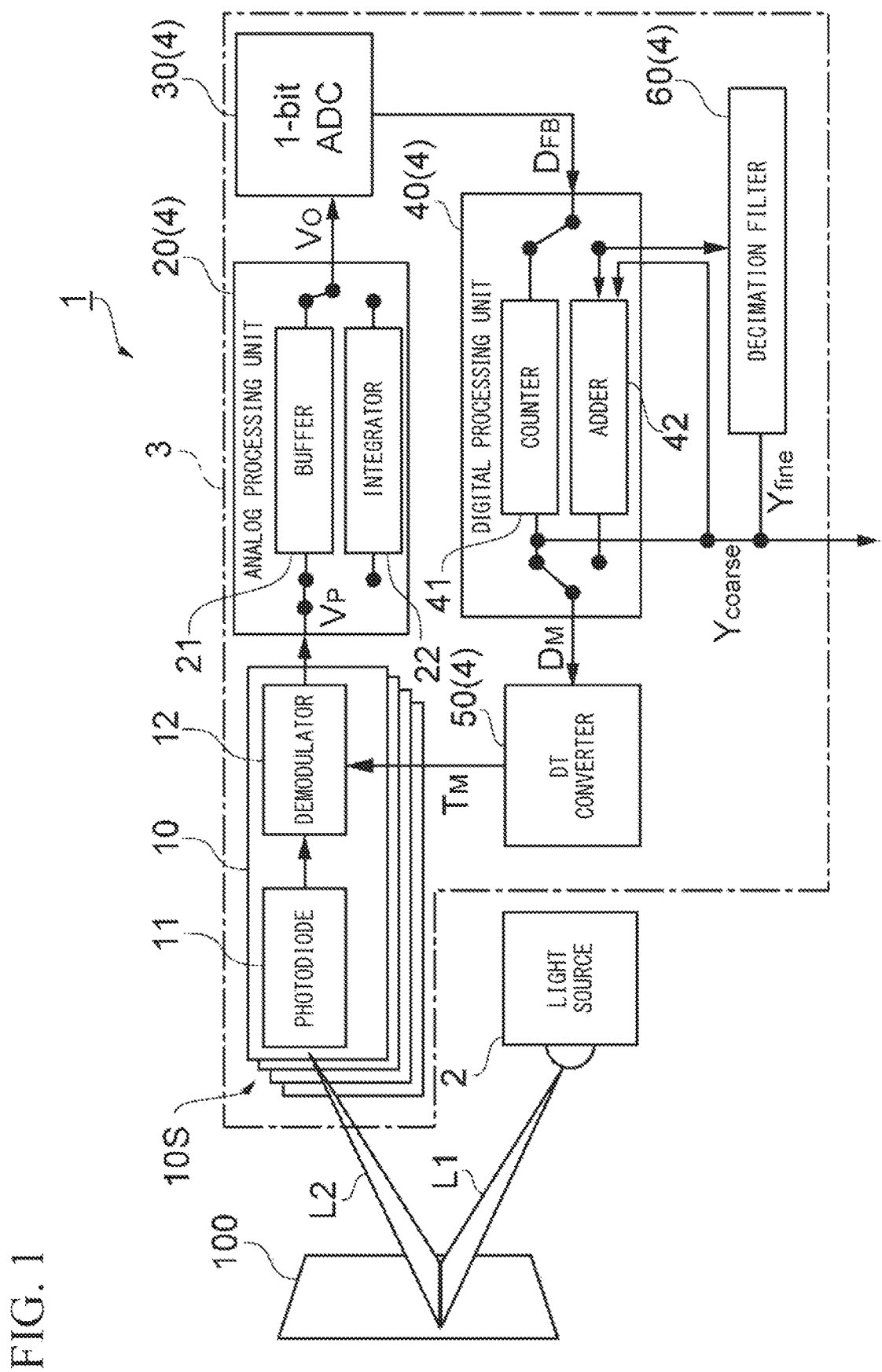
FIG. 1 is a diagram showing a configuration of a distance image capturing device.

A distance image capturing device 1 shown in FIG. 1 obtains a distance image. The distance image is an image including distance information from the distance image capturing device 1 to a target object 100. The distance image capturing device 1 emits irradiation light L1 (measurement light) toward the target object 100. The irradiation light L1 is reflected on the surface of the target object 100. The reflected light L2 is incident on the distance image capturing device 1. The distance image capturing device 1 obtains a time difference between a timing at which the irradiation light L1 is emitted and a timing at which the reflected light L2 is received. The time difference is also referred to as a light flight time. The light flight time is the time required for the irradiation light L1 to reach the distance image capturing device 1 from the target object 100 after reaching the target object 100. That is, the light flight time is determined according to the distance from the distance image capturing device 1 to the target object 100. Therefore, by obtaining the light flight time, the distance from the distance image capturing device 1 to the target object 100 can be obtained.

Figure 3:
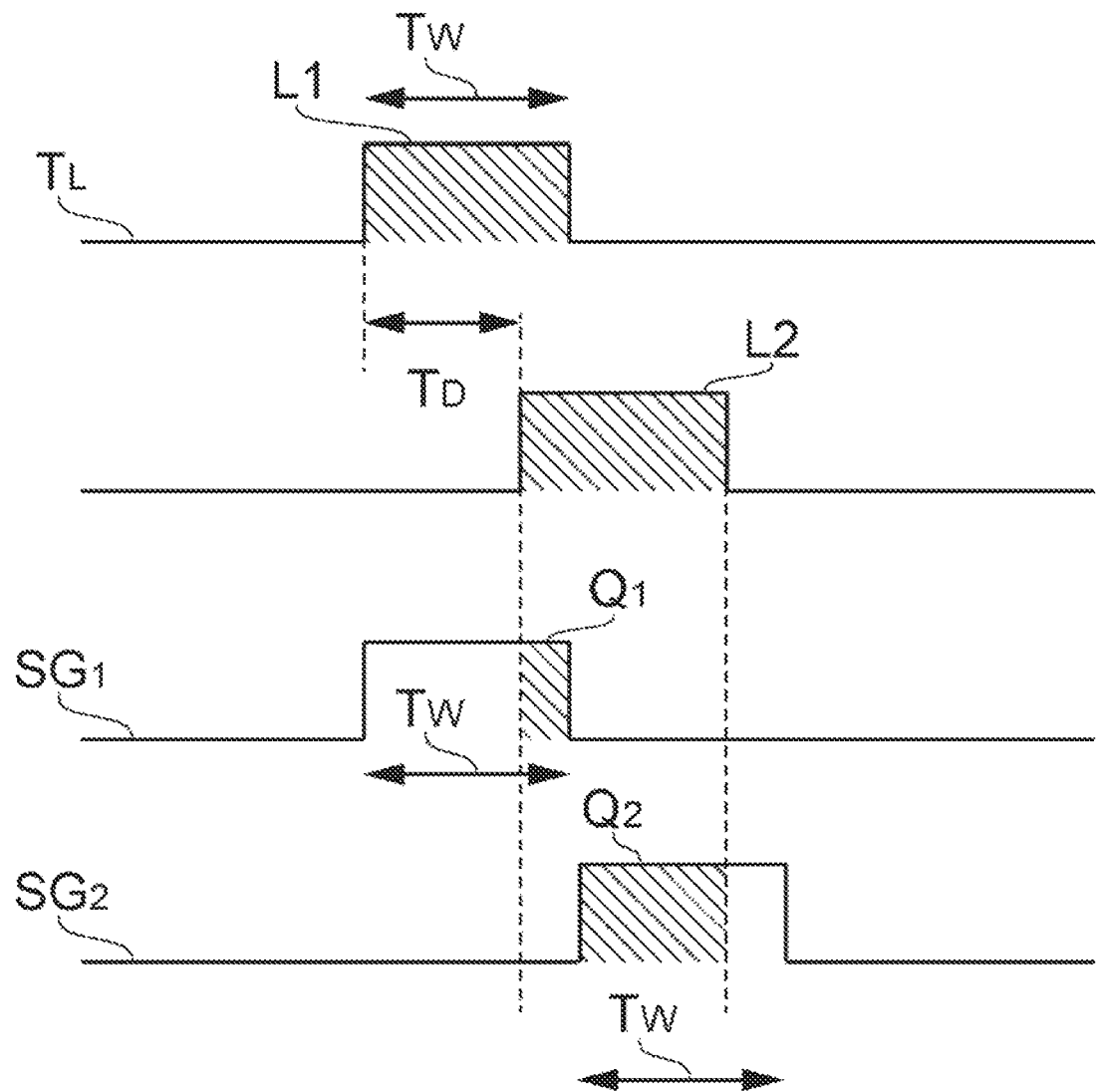
FIG. 3 is a diagram showing a principle of the distance image capturing device.

The principle of measuring a distance will be described. FIG. 3 is a diagram showing a principle of the distance image capturing device 1. The distance image capturing device 1 indirectly measures the light flight time. The distance image capturing device 1 has a plurality of areas for accumulating charges. The distance image capturing device 1 distributes the charges generated in a photoelectric conversion area due to the incident light to each accumulation area. The distribution is performed by a gate that controls the transfer of the charges from the photoelectric conversion area to the accumulation area. The charges are transferred to a first accumulation area in a first period. In the first period, no charge is transferred to a second accumulation area. Then, in the second period following the first period, the transfer of the charges to the first accumulation area is stopped, and the charges are transferred to the second accumulation area. When a time $T_w$ of the first period and the second period and the ratio of a first charge amount $Q_1$ in the first accumulation area and a second charge amount $Q_2$ in the second accumulation area are used, the light flight time can be obtained.

It is assumed that the temporal relationship between the timing of emitting the irradiation light L1 and a charge transfer period to the first accumulation area does not change. Similarly, regarding a charge transfer period to the second accumulation area, it is assumed that the temporal relationship does not change. Based on the assumption, the distance image capturing device 1 is operated. As shown in part (a) of FIG. 4, when the distance to the target object 100 is short, the time from the emission of the irradiation light L1 to the incident of the reflected light L2 is short. Therefore, the first charge amount $Q_1$ accumulated in the first accumulation area operated by a first transfer control pulse $SG_1$ increases. On the other hand, the second charge amount $Q_2$ accumulated in the second accumulation area operated by a second transfer control pulse $SG_2$ decreases. As shown in part (b) of FIG. 4, when the distance to the target object 100 is long, the time from the emission of the irradiation light L1 to the incident of the reflected light L2 is long. Therefore, the first charge amount $Q_1$ accumulated in the first accumulation area decreases. On the other hand, the second charge amount $Q_2$ accumulated in the second accumulation area increases. That is, as the distance to the target object 100 increases, the first charge amount $Q_1$ decreases and the second charge amount $Q_2$ increases.

When an accumulation operation of accumulating charges in the first accumulation area and the second accumulation area is performed, the charges not attributed to the reflected light L2 are also accumulated. That is, the charges attributed to the reflected light L2 and the charges not attributed to the reflected light L2 are accumulated in the accumulation area. The charges not attributed to the reflected light L2 are a noise component. The noise component may be generated not only when charges are accumulated but also when charges are read.

When the charge amount attributed to the reflected light L2 is small, the proportion of the charge amount not attributed to the reflected light L2 increases relatively. As a result, the performance of the distance image capturing device 1 is affected, such as a decrease in distance resolution. The problem increases as the upper limit or the lower limit of the measurement range of the distance image capturing device 1 is approached. That is, when the timing of transfer to the first accumulation area and the second accumulation area is always constant as adopted in a distance image capturing device in related art, the charge amount accumulated in one accumulation area exceedingly decreases depending on the distance to the target object 100. As a result, the distance resolution is decreased.

As a result of diligent studies by the inventors of the present invention, it has been conceived that the above problem can be solved by changing the temporal relationship between the timing of emitting the irradiation light L1 and the transfer period of charges to the first accumulation area. The timing of opening the first transfer control gate $G_1$ and the second transfer control gate $G_2$ is not fixed with respect to the emission timing of the irradiation light L1 but is variable. The inventors of the present invention have come up with the idea of controlling a timing to open the first transfer control gate $G_1$ and the second transfer control gate $G_2$ according to the magnitude relationship of the first charge amount $Q_1$ transferred by the first transfer control gate $G_1$ and the second charge amount $Q_2$ transferred by the second transfer control gate $G_2$.

According to the control according to the magnitude relationship of the charge amounts, it is possible to perform an operation of reducing the bias between the first charge amount $Q_1$ and the second charge amount $Q_2$. That is, it is possible to perform an operation that reduces the difference in the charge amount. As a result, the influence of noise can be suppressed. Furthermore, it is also possible to apply the so-called Delta Sigma modulation technology, according to the control according to the magnitude relationship of the charge amounts. According to the Delta Sigma modulation technology, a quantization error can be reduced. That is, it is possible to improve the distance resolution over the entire measurement range by eliminating the bias of the accumulated charges and reducing the quantization error by introducing the Delta Sigma modulation technology.

In the control using the magnitude relationship of the charge amount, a feedback loop is configured in which the timing of transferring charges is controlled according to the magnitude relationship of the charge amount. The difference in the charge amount accumulated in the accumulation area is converted into a difference in analog voltage. Next, the difference in analog voltage is converted into a binary digital value. Next, a timing of transferring charges is determined using the digital value. When a pixel is operated based on the determined timing, charges are accumulated again in the accumulation area. The feedback loop has a technical feature in that a timing for transferring charges is determined using a digital value. That is, the digital value is converted into time. The inventors of the present invention named the technology "time-domain feedback control".

The control of transferring charges according to the magnitude relationship of the charge amount includes two aspects.

In a first aspect, the objective of the control is to reduce the difference in the charge amount. According to the first aspect, an approximate light flight time including a known deviation can be obtained. The inventors of the present invention have named the measurement to obtain the approximate light flight time according to the first aspect as a "coarse measurement". In the following description, it is also simply referred to as a "C measurement" (first measurement).

FIG. 5 is a diagram describing the C measurement. FIG. 5 shows an example in which the feedback operation is performed four times. The time deviation between the emission period of the irradiation light L1 and the incident period of the reflected light L2 corresponds to the distance to the target object 100 that has generated the reflected light L2.

In the first operation (n=1), the end of a first transfer period coincides with the midpoint of the emission period of the irradiation light L1. The end of the first transfer period coincides with the start of a second transfer period. Therefore, the start of the second transfer period also coincides with the midpoint of the emission period. The reflected light L2 is received between such a first transfer period and a second transfer period. In the following description, the operation of receiving the reflected light L2 to generate charges is also referred to as an "exposure operation". In the first exposure operation, the incident period of the reflected light L2 does not overlap the first transfer period. The incident period of the reflected light L2 overlaps a portion of the second transfer period. As a result of the first exposure operation, a result is obtained that the first charge amount $Q_1$ in the first accumulation area is smaller than the second charge amount $Q_2$ in the second accumulation area. In a case of being evaluated by the difference in the charge amount (=the second charge amount $Q_2$−the first charge amount $Q_1$), it can be said that the sign is plus (positive).

Based on the result, the first transfer period and the second transfer period in the second (n=2) exposure operation are set. When the difference in the charge amount is positive, the first transfer period and the second transfer period are delayed by a unit delay time $\Delta t_D$ from the initial timing. In the second exposure operation, the first transfer period and the second transfer period are set at timing delayed by the unit delay time $\Delta t_D$ from the first exposure operation. In the second exposure operation, the incident period of the reflected light L2 does not overlap the first transfer period. The incident period of the reflected light L2 overlaps the entire period of the second transfer period. As a result, the sign of the difference in the charge amount is still positive.

In the third exposure operation (n=3), the first transfer period and the second transfer period are further delayed by the unit delay time $\Delta t_D$ from the timing of the second exposure operation. That is, the first transfer period and the second transfer period of the third exposure operation are delayed by $2\Delta t_D$ from the first transfer period and the second transfer period of the first exposure operation. In the third exposure operation, the incident period of the reflected light L2 overlaps a portion of the first transfer period. Furthermore, the incident period of the reflected light L2 also overlaps a portion of the second transfer period. The overlapping period of the second transfer period is longer than the overlapping period of the first transfer period. Therefore, the sign of the difference in the charge amount is still positive.

In the fourth exposure operation (n=4), the first transfer period and the second transfer period are further delayed by the unit delay time $\Delta t_D$ from the timing of the third exposure operation. That is, the first transfer period and the second transfer period of the third exposure operation are delayed by $3\Delta t_D$ from the first transfer period and the second transfer period of the first exposure operation. In the fourth exposure operation, the incident period of the reflected light L2 overlaps a portion of the first transfer period. Furthermore, the incident period of the reflected light L2 also overlaps a portion of the second transfer period. The overlapping period of the first transfer period is longer than the overlapping period of the second transfer period. Therefore, the sign of the difference in the charge amount is negative.

Here, when the first charge amount $Q_1$ accumulated in the first transfer period and the second charge amount $Q_2$ accumulated in the second transfer period are equal, the end of the first transfer period coincides with the center of the incident period of the reflected light L2. When the irradiation timing (start, center, or end) of the irradiation light L1 is known, and the timings of the first transfer period and the second transfer period at which the difference in charge amount is zero are known, the incident timing of the reflected light L2 with respect to the irradiation light L1 can be known. That is, the light flight time can be known.

In the first to fourth operations described above, the first transfer period and the second transfer period are shifted by each unit delay time $\Delta t_D$. Then, a case where the difference in the charge amount is zero may occur. A case where the difference in the charge amount is not zero may also occur. However, it can be seen that there is a timing at which the difference is zero between the timing when the sign of the difference in the charge amount is positive and the timing when the sign of the difference in the charge amount is negative.

An approximate light flight time can be obtained by searching for a delay time for switching the sign of the difference. The "approximate" means that an error corresponding to the unit delay time $\Delta t_D$ is included as the maximum value. The negative feedback used for the C measurement converts a digital value based on the difference in the charge amount into time. The converted time corresponds to the delay time of the transfer control pulse for the first transfer period and the second transfer period. In other words, the control for reducing the difference in the charge amount can also be said to be negative feedback control in which the difference between the delay time of the transfer control pulse and the light flight time is reduced. With such control, it is possible to maintain a constant operating point of the analog readout circuit. As a result, linearity can be effectively improved.

The result of the C measurement includes a delay time and a difference in the charge amount obtained by the operation of the delay time. The result of the C measurement is used in the processing of an F measurement to be described below.

A second aspect in the control of transferring charges according to the magnitude relationship of the charge amount will be described. In the second aspect, the difference in the charge amount is integrated each time the exposure operation is repeated. In the second aspect, the delay time given to the first transfer period and the second transfer period is changed for each exposure operation. The change in the delay time to be given is determined by a result of integrating the difference in the charge amount. The result of the integration is converted into a binary digital value of 0 or 1. When the exposure operation is repeated a plurality of times, information represented by 0 or 1 is obtained. The number of times 0 appears and the number of times 1 appears are related to the true light flight time. Therefore, by using the number of times 0 appears and the number of times 1 appears, a more precise light flight time can be obtained from the approximate light flight time obtained by the C measurement. The inventors of the present invention have named the measurement for obtaining precise light flight time according to the second aspect as a "fine measurement". In the following description, it is also simply referred to as an "F measurement" (second measurement).

A basic operation of the F measurement will be described. In the F measurement, the delay time given to the first transfer period and the second transfer period is changed for each exposure operation. FIG. 6 conceptually shows the change of the delay time. In the F measurement, a first delay time ($2\Delta t_D$) and a second delay time ($3\Delta t_D$) are used. In the first delay time ($2\Delta t_D$), the sign of the difference in the charge amount is positive as a result of the exposure operation (see part (a) of FIG. 6). In the second delay time ($3\Delta t_D$), the sign of the difference in the charge amount is negative as a result of the exposure operation (see part (b) of FIG. 6). Which delay time is to be adopted is determined based on a multiple of the unit delay time $\Delta t_D$ given before and after the sign of the difference in the charge amount in the C measurement changes from positive to negative, and an integrated value of the charge amount. For example, as shown in FIG. 5, when $2\Delta t_D$ is changed to $3\Delta t_D$, the sign of the difference in the charge amount changes from positive to negative, so that the first delay time is set as $2\Delta t_D$ and the second delay time is set as $3\Delta t_D$. However, this is exemplary. The first delay time and the second delay time may be any combination as long as the difference in the charge amount is positive and negative.

FIG. 7 shows a transition of the number of exposure operations and a transition of an integrated value of a difference in charges. FIG. 7 also shows a relationship between the sign of the integrated value and the delay time corresponding to the sign of the integrated value. The zeroth time in the F measurement corresponds to an operation one time before the final time in the C measurement. In the C measurement described above, the result of the (third) exposure operation, which is one time before the final time, is a differential charge amount $\Delta Q$ indicating a difference in the charge amount. The sign of the differential charge amount $\Delta Q$ is positive. When the sign of the differential charge amount $\Delta Q$ is positive, the second delay time ($3\Delta t_D$) is adopted in the next exposure operation. As a result of the first exposure operation in the F measurement, the differential charge amount $\Delta Q$ (the sign is negative) is obtained. This differential charge amount $\Delta Q$ is added to the zeroth integrated value. As a result, a new integrated value is obtained. The sign of the new integrated value is still positive. Therefore, the second delay time ($3\Delta t_D$) is also adopted in the subsequent second exposure operation. In this manner, the accumulation of charges by the exposure operation, the acquisition of the difference in the charge amount, the addition of the acquired differences, and the selection of the delay time according to the sign of the addition result are sequentially repeated. In the example of FIG. 7, the sign of the integrated value is also positive for the result of the third exposure operation. On the other hand, the absolute value of the integrated value gradually decreases.

As a result of the fourth exposure operation, the sign of the integrated value is switched from positive to negative. When the sign of the integrated value is negative, the first delay time ($2\Delta t_D$) is adopted in the next sixth exposure operation. As a result of the sixth exposure operation, the sign of the difference in the charge amount is positive (see part (a) of FIG. 6). When the difference in the charge amount for the sixth time is added to the integrated value for the fifth time, the sign of the integrated value becomes positive again. FIG. 7 shows a state of the exposure operation up to the tenth time.

In the integration operation of the F measurement, the added value to the integrated value increases in proportion to the magnitude of the error between the delay time given to the first transfer period and the second transfer period and the light flight time to be obtained. Therefore, the occurrence frequency of the delay time with a small error increases. On the other hand, the occurrence frequency of the delay time with a large error decreases. That is, the light flight time can be obtained by weighting and averaging the first delay time and the second delay time with the occurrence frequency.

Next, in the F measurement, a precise light flight time is calculated. For example, in FIG. 7, the first delay time ($2\Delta t_D$) appears twice as a result of the first to tenth exposure operations. The second delay time ($3\Delta t_D$) appears eight times. As a result, the light flight time is obtained by Formula (1).

$$\text{TOF} = \{2\times(2\Delta t_D) + 8\times(3\Delta t_D)\}/10 = 2.8\Delta t_D \quad (1)$$

It can be also said that the above-described operation of the F measurement applying the time-domain feedback control, which is the negative feedback technology in the time-domain, is a so-called first-order Delta Sigma modulation (DSM) operation. The Delta Sigma modulation has self-sufficient low distortion and low noise characteristics by using oversampling signal processing. As a result, the distance image capturing device 1 can achieve high linearity and high distance resolution.

Summarizing the discussions so far, the distance image capturing device 1 adopts the technical concept of the time-domain feedback control. Then, as a first aspect of the time-domain feedback control, the C measurement for obtaining an approximate light flight time is performed. Thereafter, as a second aspect of the time-domain feedback control, the F measurement for obtaining a precise light flight time is performed. According to such an operation, the distance image capturing device 1 can achieve high linearity, high distance resolution, or the like, and the comprehensive performance is improved.

Next, a short pulse-based indirect TOF image sensor using the time-domain feedback control will be described in detail.

FIG. 1 is a functional block diagram of the distance image capturing device 1. The distance image capturing device 1 has a light source 2 and a distance image sensor 3. The light source 2 emits the irradiation light L1. The irradiation light L1 is reflected by the target object 100. The reflected irradiation light L1 is converted into a voltage signal by a photodiode 11 and a demodulator 12. The distance image sensor 3 has the photodiode 11, the demodulator 12, an analog processing unit 20 (first calculation unit), an A/D converter 30, a digital processing unit 40 (second calculation unit), and a DT converter 50 (second calculation unit and delay time determination unit). The elements constitute a time-domain negative feedback loop. The distance image sensor 3 obtains a light flight time. By obtaining the light flight time, the distance to the target object 100 can be obtained.

The distance image sensor 3 performs the C measurement and the F measurement described above. According to the operations, the performance of the distance image sensor 3 can be improved. More specifically, the distance image sensor 3 has high linearity indicating a relationship between the light flight time and the distance. The distance image sensor 3 has the high resolution of the light flight time. That is, the distance image sensor 3 has the high distance resolution. Furthermore, the distance image sensor 3 can maintain high linearity and high resolution over a wide measurement range.

The distance image sensor 3 switches between a time-domain negative feedback loop for the C measurement and a time-domain negative feedback loop for the F measurement. The operation can be switched by selecting two types of operations (buffer operation and integration operation) realized by the analog processing unit 20 and selecting two types of operations (counting operation and adding operation) realized by the digital processing unit 40. In the C measurement, the operation as a buffer 21 realized by the analog processing unit 20 is selected, and the operation as a counter 41 realized by the digital processing unit 40 is selected. In the F measurement, the operation as an integrator 22 realized by the analog processing unit 20 is selected, and the operation as an adder 42 realized by the digital processing unit 40 is selected. When the F measurement is performed, the distance image sensor 3 can be regarded as the first-order Delta Sigma modulator.

The light source 2 generates the irradiation light L1 that is emitted to the target object 100 in order to perform distance measurement by the light flight time (time of flight (TOF)) method. The light source 2 has a semiconductor light emitting element and a driving circuit. The semiconductor light emitting element generates light in a wavelength range such as a near-infrared range or a visible light range. A light emitting diode or a laser diode can be adopted as the semiconductor light emitting element.

The distance image sensor 3 receives the reflected light L2 from the target object 100. The distance image sensor 3 outputs a distance image by using the received reflected light L2. The distance image sensor 3 has the photodiode 11, the demodulator 12, the analog processing unit 20, the A/D converter 30, the digital processing unit 40, and the DT converter 50. The distance image sensor 3 has a decimation filter 60.

The photodiode 11 of a pixel circuit unit 10 receives the reflected light L2. The distance image capturing device 1 has a plurality of pixel circuit units 10 disposed in a two-dimensional shape. The plurality of pixel circuit units 10 disposed in a two-dimensional shape constitute a pixel circuit unit array 10S. The photodiode 11 generates charges corresponding to the reflected light L2. The pixel circuit unit 10 transfers the charges generated by the photodiode 11 to the demodulator 12. The output value of the pixel circuit unit 10 is based on the first charge amount $Q_1$, the second charge amount $Q_2$, and the differential charge amount $\Delta Q$. The physical configuration of the pixel circuit unit 10 will be described later.

The demodulator 12 controls the transfer of the charges from the photodiode 11. The demodulator 12 outputs the difference in the charge amount received from the photodiode 11 as a voltage difference. The output value of the demodulator 12 includes a first front stage voltage signal $V_{P1}$, a second front stage voltage signal $V_{P2}$, and a differential front stage voltage signal $\Delta V_P$. The physical configuration of the demodulator 12 will be described later.

The analog processing unit 20, the A/D converter 30, the digital processing unit 40, and the DT converter 50 constitute a peripheral circuit 4. The peripheral circuit 4 may include the decimation filter 60.

The analog processing unit 20 processes a voltage difference. The processing performed by the analog processing unit 20 includes processing of multiplying the voltage difference by an integer and processing of integrating the voltage difference. The analog processing unit 20 includes the buffer 21 that performs the processing of multiplying the voltage difference by an integer. The analog processing unit 20 includes the integrator 22 that performs the processing of integrating the voltage difference. The output value of the analog processing unit 20 includes a first subsequent stage voltage signal $V_{O1}$ (first voltage), a second subsequent stage voltage signal $V_{O2}$ (second voltage), and a differential subsequent stage voltage signal $\Delta V_O$ (differential voltage). A specific circuit configuration of the analog processing unit 20 will be described later.

The A/D converter 30 quantizes a voltage output by the analog processing unit 20. Specifically, the A/D converter 30 converts a voltage output by the analog processing unit 20 into a binary digital value of 0 or 1. The output value of the A/D converter 30 includes a digital signal $D_{FB}$.

The digital processing unit 40 processes the digital signal $D_{FB}$ output by the A/D converter 30. The processing performed by the digital processing unit 40 includes the processing of counting 0 or 1 indicated by the inputted digital signal $D_{FB}$ and the processing of adding the inputted digital signal $D_{FB}$ to another digital signal stored in advance. The digital processing unit 40 includes the counter 41 that performs the processing of counting 0 or 1. The output end of the counter 41 is connected to the DT converter 50 and the adder 42. The digital processing unit 40 includes the adder 42 that performs addition processing. The A/D converter 30 and the counter 41 are connected to the input end of the adder 42. That is, the adder 42 can receive the output value of the A/D converter 30 and the output value of the counter 41. The output end of the adder 42 is connected to the DT converter 50. The output value of the digital processing unit 40 includes a digital signal $D_M$.

In the case of the F measurement, the adder 42 and the DT converter 50 determine a delay time for the next accumulation operation according to a sign of the integration result. The sign of the integration result corresponds to the value of the digital signal $D_M$, which is the output value of the digital processing unit 40. The adder 42 and the DT converter 50 determine $3\Delta t_D$ as the delay time when the sign of the integration result is zero or positive (first information). $3\Delta t_D$ is the delay time at which the difference in charges is negative. The adder 42 and the DT converter 50 determine $2\Delta t_D$ as the delay time when the sign of the integration result is negative (second information). $2\Delta t_D$ is the delay time at which the difference in charges is positive.

The decimation filter 60 is connected to an input end of the adder 42 of the digital processing unit 40. The decimation filter 60 receives the digital signal $D_{FB}$ together with the adder 42. The decimation filter 60 performs digital filter processing on the digital signal $D_{FB}$. The digital filter processing includes low-pass filter processing and down-sampling processing. For example, in the decimation filter 60, the oversampling ratio of the low-pass filter processing may be an integer that is larger than $2^{B-1}$ and smaller than $2^B$. B may be a minimum number of bits configured to represent an oversampling ratio.

Figure 2:
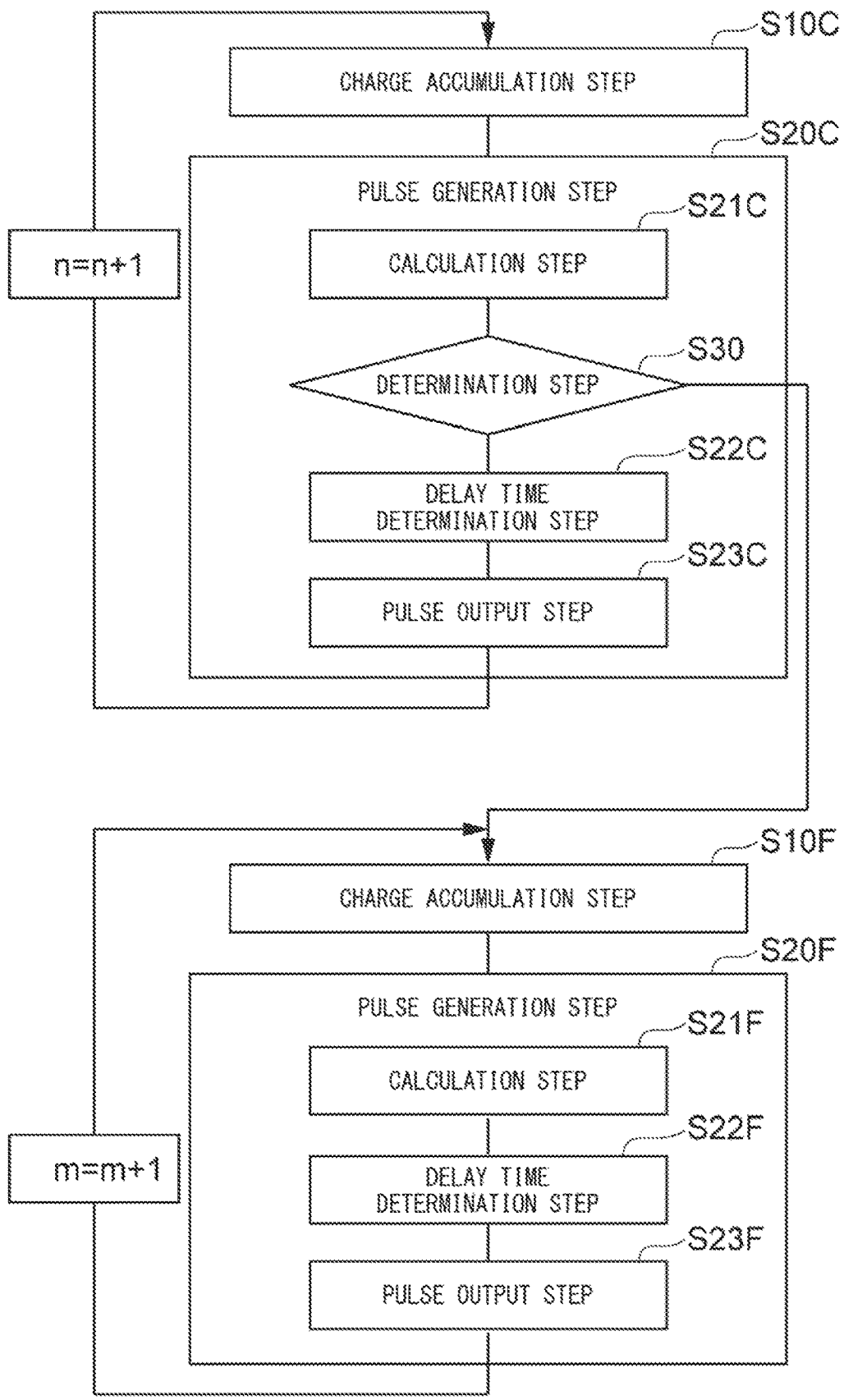
FIG. 2 is a flowchart showing a main step of a method for capturing a distance image.

According to the functional block diagram of FIG. 1 and the flowchart of FIG. 2, a method for capturing a distance image by using the distance image capturing device 1 includes charge accumulation steps S10C and S10F and pulse generation steps S20C and S20F. In the method for capturing a distance image, the charge accumulation step S10C and the pulse generation step S20C are repeatedly performed. The charge accumulation step S10C and the pulse generation step S20C constitute the C measurement. Thereafter, in the method for capturing a distance image, the charge accumulation step S10F and the pulse generation step S20F are repeatedly performed. The charge accumulation step S10F and the pulse generation step S20F constitute the F measurement.

The charge accumulation step S10C is executed by the pixel circuit unit 10. As the charge accumulation step S10C, the pixel circuit unit 10 accumulates the first charge in a first floating diffusion unit FD1 based on the first transfer control pulse SG1 given to the first transfer control gate $G_1$. Furthermore, as the charge accumulation step S10C, the pixel circuit unit 10 accumulates the second charge in a second floating diffusion unit $FD_2$, based on the second transfer control pulse $SG_2$ given to the second transfer control gate G2. The pulse generation step S20C is executed by the peripheral circuit 4. As the pulse generation step S20C, the peripheral circuit 4 generates the first transfer control pulse $SG_1$ and the second transfer control pulse $SG_2$, based on the magnitude relationship between the first charge amount $Q_1$ and the second charge amount $Q_2$.

The pulse generation step S20C includes a calculation step S21C, a determination step S30, a delay time determination step S22C, and a pulse output step S23C. The calculation step S21C is executed by the demodulator 12 and the analog processing unit 20. The A/D converter 30 may be included as an element that performs the calculation step S21C. The calculation step S21C outputs the calculated value related to the difference between the first voltage based on the first charge and the second voltage based on the second charge. The calculated value may be the differential voltage itself. The calculated value may be a digital value obtained by binarizing the differential voltage.

After the calculation step S21C, it is determined whether or not the light flight time (TOF) is obtained (step S30). When it is determined that the light flight time (TOF) is obtained, the process proceeds to the F measurement loop. When it is not determined that the light flight time (TOF) is obtained, the process proceeds to the delay time determination step S22C.

The delay time determination step S22C is executed by the digital processing unit 40. The delay time determination step S22C determines the delay time for determining the timing to output the first transfer control pulse $SG_1$ and the second transfer control pulse $SG_2$ by using the calculated value. The delay time determination step S22C for the C measurement is executed by the counter 41 of the digital processing unit 40. The counter 41 can realize an operation in which in the n-th calculation step S21C, the n-th delay time used for the n-th charge accumulation step S10C when the calculated value is the first information (the determination step S30) is further delayed by the unit delay time, which is determined as the (n+1)-th delay time used for the (n+1)-th charge accumulation step.

The pulse output step S23C is executed by the DT converter 50. The pulse output step S23C outputs the first transfer control pulse $SG_1$ and the second transfer control pulse $SG_2$, based on the determined delay time.

The step for the F measurement has a charge accumulation step S10F and a pulse generation step S20F. The pulse generation step S20F has a calculation step S21F, a delay time determination step S22F, and a pulse output step S23F. The calculation step S21F is executed by the integrator 22 of the analog processing unit 20. The integrator 22 can realize an operation in which after the difference between the first voltage and the second voltage is output as the differential voltage, the result of adding the m-th differential voltage to the integrated value obtained from the first to (m−1)-th differential voltages is obtained as the integrated value of the m-th differential voltage. The delay time determination step S22F is executed by the adder 42 of the digital processing unit 40. The adder 42 can realize an operation in which when the m-th integrated value is the second information, the (m+1)-th delay time used for the (m+1)-th charge accumulation step is determined as the first delay time. Furthermore, the adder 42 can realize an operation in which when the m-th integrated value is the first information, the (m+1)-th delay time is determined as the second delay time.

As described above, in the time-domain feedback control, the C measurement and the F measurement can be performed. The distance image capturing device 1 shown in FIG. 1 can realize a configuration in which the C measurement is performed and a configuration in which the F measurement is performed. The configuration in which the C measurement is performed and the configuration in which the F measurement is performed are switchable. An approximate light flight time is obtained by a configuration in which the C measurement is performed. After the approximate light flight time is obtained, the configuration is switched from the configuration in which the C measurement is performed to the configuration in which the F measurement is performed. A more precise light flight time is obtained by the F measurement. Switching between the configuration in which the C measurement is performed and the configuration in which the F measurement is performed can be realized by the selection of the buffer 21 or the integrator 22 constituting the analog processing unit 20 and the selection of the counter 41 or the adder 42 constituting the digital processing unit 40.

When the C measurement is performed, the analog processing unit 20 functions as the buffer 21. The digital processing unit 40 functions as the counter 41. FIG. 8 is an equivalent block diagram of a configuration in which the C measurement is performed.

In the configuration for performing the C measurement, the distance image sensor 3 has an addition point F8a, a first transfer element F8b, a second transfer element F8c, a third transfer element F8d, a fourth transfer element F8e, and a fifth transfer element F8f. The addition point F8a and the first transfer element F8b correspond to the demodulator 12. The second transfer element F8c corresponds to the buffer 21. The third transfer element F8d corresponds to the A/D converter 30. The fourth transfer element F8e corresponds to the counter 41. The fifth transfer element F8f corresponds to the DT converter 50.

The C measurement will be described with reference to the equivalent block diagram of FIG. 8. In the equivalent block diagram, a subsequent stage voltage signal $V_O$ (calculated value) that is an output value of the second transfer element F8c (buffer 21) is represented by Formula (2).

$$V_O = K_{BUF} K_M (\text{ToF} - T_M) \qquad (2)$$

$V_O$: a magnitude of a subsequent stage voltage signal that is output by the second transfer element F8c (the buffer 21).

$K_{BUF}$: a gain of the second transfer element F8c (the buffer 21).

$K_M$: a time-voltage conversion gain of the demodulator 12.

TOF: a light flight time.

$T_M$: A delay time signal that is output by the fifth transfer element F8f (the DT converter 50).

The third transfer element F8d (the A/D converter 30) quantizes the subsequent stage voltage signal $V_O$ that is output by the second transfer element F8c (the buffer 21). The quantization processing follows Formula (3). The third transfer element F8d (the A/D converter 30) generates the digital signal $D_{FB}$ as an increment code for the digital-domain feedback as a result of the quantization processing.

$$D_{FB} = \begin{cases} 0 & (V_O < 0) \\ 1 & (V_O \geq 0) \end{cases} \qquad (3)$$

The fourth transfer element F8e (the counter 41) receives the digital signal $D_{FB}$. When the digital signal $D_{FB}$ is 1 during the n-th operation, the fourth transfer element F8e performs a count-up operation of adding 1 to the (n−1)-th internal variable (control variable). The counter 41 counts the digital signal $D_{FB}$ whose component is 1. For example, when the difference value of the charges is the first information (0 or positive) in the case of the C measurement, the A/D converter 30 outputs "1" as a digital value. On the other hand, when the differential value of the charges is the second information (negative) in the C measurement, the A/D converter 30 outputs "0" as a digital value. The counter 41 may perform a counting operation based on the digital value. As a result of performing the operation n times, the digital signal $D_M$ (n) output by the counter 41 is shown in Formula (4).

$$D_M(n)=D_M(n-1)+D_{Fb} \tag{3}$$

The fifth transfer element F8f (the DT converter 50) receives the digital signal $D_M$. The fifth transfer element F8f (the DT converter 50) obtains the delay time signal $T_M$ according to Formula (5). The delay time signal $T_M$ is obtained by multiplying the unit delay time $\Delta t_D$ by the digital signal $D_M$.

$$T_M(n)=\Delta t_D \cdot D_M(n) \tag{5}$$

$T_M$ (n): a delay time signal in the n-th operation.
$\Delta t_D$: a unit delay time. It is a conversion factor of the DT converter 50.

Part (a) of FIG. 9 conceptually describes an operation of the C measurement. Part (a) of FIG. 9 shows the digital signal $D_{FB}$ and the delay time signal $T_M$. In the first feedback operation, the delay time signal $T_M$ is set to zero. When as a result of the n-th feedback operation, the digital signal $D_{FB}$ that is the output value of the A/D converter 30 is 1, in the (n+1)-th feedback operation, the unit delay time $\Delta t_D$ is added to the delay time signal $T_M$. Therefore, in the repeated feedback operation, as long as the digital signal $D_{FB}$ is 1, the delay time signal $T_M$ increases stepwisely with the unit delay time $\Delta t_D$ as one step. The delay time approaches the light flight time (TOF).

As a result of the plurality of feedback operations, the delay time signal $T_M$ becomes larger than the light flight time (TOF). When the delay time signal $T_M$ is larger than the light flight time (TOF), the A/D converter 30 outputs the digital signal $D_{FB}=0$ as an output value. When the digital signal $D_{FB}$ is zero, the addition of the unit delay time $\Delta t_D$ with respect to the delay time signal $T_M$ is stopped. In other words, the increment in the delay time signal $T_M$ that is the output value of the DT converter 50 is stopped. Assuming that the stop of the increase in the delay time signal $T_M$ occurs in the $n_C$-th feedback operation, the digital signal $D_M$, which is the output value of the counter 41, is represented by Formula (6).

$$D_M(n_C)=n_C \tag{6}$$

$D_M$ ($n_C$): an output value of the counter 41 in the $n_C$-th feedback operation.
$n_C$: the number of times that the stop of the increase in the delay time signal $T_M$ has occurred.
$n_C$ defines the maximum value of the delay time signal $T_M$ in the DT converter 50. The delay time signal $T_M$ ($n_C$), which is the output value of the DT converter 50 in the final step ($n_C$), is represented by Formula (7).

$$T_M(n_C)=\Delta t_D n_C \tag{7}$$

By the way, in the C measurement, the DT converter 50 performs an incremental operation. Therefore, the difference between the light flight time (TOF) and the delay time signal $T_M$ ($n_C$) is an error. As shown in part (b) of FIG. 9, the error is a value between $-\Delta t_D/2$ and $+\Delta t_D/2$. The measurement range ($T_{M,Max}$) of the light flight time (TOF) is represented by Formula (8).

$$T_{M,Max}=N_C \cdot \Delta t_D \tag{8}$$

$T_{M,Max}$: a measurement range of the light flight time (TOF).
$N_C$: the maximum number of feedback operations in the C measurement.
$\Delta t_D$: a unit delay time.

The final output result of the C measurement is an output $Y_{coarse}$. The output $Y_{coarse}$ is the final code stored in the counter 41. The final code is represented by Formula (9).

$$Y_{coarse}=n_C \tag{9}$$

$Y_{coarse}$: the final output result of the C measurement.
$n_C$: a counter value when the stop of the increase in the unit delay time $\Delta t_D$ occurs.

The time required for one feedback operation is defined as time ($T_{CM0}$). Time $T_{CM}$ required to execute the C measurement is represented by Formula (10).

$$T_{CM}=N_C \cdot T_{CM0} \tag{10}$$

When the F measurement is performed, the analog processing unit 20 functions as the integrator 22. The digital processing unit 40 functions as the adder 42. FIG. 10 is an equivalent block diagram of a configuration in which F measurement is performed. FIG. 10 is an equivalent block diagram of the F measurement adopting first-order Delta Sigma modulation (DSM) with time-domain negative feedback.

The distance image sensor 3 has a first addition point F10a, a second addition point F10b, a sixth transfer element F10c, a seventh transfer element F10d, a third addition point F10e, an eighth transfer element F10f, a ninth transfer element F10g, and a tenth transfer element F10h. The sixth transfer element F10c and the second addition point F10b correspond to the demodulator 12. The seventh transfer element F10d corresponds to the integrator 22. The addition point F10e corresponds to the A/D converter 30. The eighth transfer element F10f corresponds to a differential circuit disposed in the feedback system of a Delta Sigma modulator F10. The ninth transfer element F10g and the tenth transfer element F10h correspond to the DT converter 50.

The F measurement will be described with reference to the equivalent block diagram of FIG. 10. According to the equivalent block diagram shown in FIG. 10, the output value $D_{FB}$ of the Delta Sigma modulator F10 is represented by Formula (11).

$$D_{FB}(z) = E_q(z) + \frac{K_{INT}K_M}{1-z^{-1}}D(z) \tag{11}$$

$K_{INT}$: a gain of the integrator 22.
$K_M$: a time-voltage conversion gain of the demodulator 12.
$E_q(z)$ is a quantization noise of the A/D converter 30. D(z) is a difference between $\Delta$TOF and time-domain feedback. D(z) is represented by Formula (12).

$$D(z)=\Delta TOF(z)-\Delta t_D z^{-1} D_{FB}(z) \tag{12}$$

$\Delta$ TOF(z): a difference in the light flight time.
$\Delta t_D$: a unit delay time.

By substituting Formula (12) into Formula (11), the entire system response in the z domain with respect to the Delta Sigma modulation portion of FIG. 10 is represented by Formula (13).

$$D_{FB}(z) = \frac{K_{INT}K_M}{1-(1-K_{INT}K_M\Delta t_D)z^{-1}}\Delta TOF(z) + \frac{1-z^{-1}}{1-(1-K_{INT}K_M\Delta t_D)z^{-1}}E_q(z) \quad (13)$$

$K_{INT}$: a gain of the integrator 22.
$K_M$: a time-voltage conversion gain of the demodulator 12.
$\Delta TOF(z)$: a difference in the light flight time.
$\Delta t_D$: a unit delay time.
$E_q(z)$: a quantization noise of the A/D converter 30.

The loop gain is 1 when the first-order Delta Sigma modulator F10 including the A/D converter 30 operates stably. As a result, the condition "$K_{INT} \times K_M \times \Delta t_D = 1$" is satisfied. According to the condition, Formula (14) can be obtained from Formula (13).

$$D_{FB}(z) = \frac{1}{\Delta t_D}\Delta TOF(z) + (1-z^{-1})E_q(z) \quad (14)$$

From Formula (14), a transfer function of the signal and the quantization noise is obtained. The signal transfer function, that is, the relationship between the digital signal $D_{FB}$ and the differential light flight time $\Delta TOF$ is the same as the reciprocal of the unit delay time $\Delta t_D$ of the DT converter 50. The relationship between the noise transfer function (NTF), that is, the digital signal $D_{FB}$ and the quantization noise $E_q$ is $1-z^{-1}$.

In order to estimate the quantization noise of the Delta Sigma transformation, the square of the noise transfer function is calculated in the frequency domain by using Formula (15). As a result, Formula (16) is obtained.

$$z = e^{j2\pi f T_{SO}} \quad (15)$$

$$|NTF(e^{j2\pi f T_{SO}})|^2 = [2\sin(\pi f / f_{SO})]^2 \quad (16)$$

f: a frequency.
$T_{SO}$: an oversampling cycle.
$f_{SO}$: an oversampling frequency.

FIG. 11 shows a form of the power spectrum density of the quantization error due to the noise transfer function given by Formula (16). A quantization error in the form shown in FIG. 11 can be effectively reduced by using a digital low-pass filter (LPF) with a cutoff frequency $f_{LPF}$. As a result, the effective number of bits (ENOB) in the F measurement is increased by the ratio of the square root of the residual noise power (hatching area) to the total noise power. When the oversampling ratio $N_F$ given by $f_{SO}/2f_{LPF}$ is used, the area ratio of the residual noise power to the total noise power is approximately $1/N_F^3$. At the time, when an ideal low-pass filter is used, an increase $\Delta ENOB_i$ of the effective number of bits is given by Formula (17).

$$\Delta ENOB_i = \log_2 N_F^{3/2} \text{ [bit]} = 1.5 \log_2 N_F \text{[bit]} \quad (17)$$

In the technology using first-order Delta Sigma transformation, $\Delta ENOB = 3$ is obtained for $N_F = 4$. However, this is the case for an ideal low-pass filter with a very steep cutoff. In a realistic circuit, a very simple counter that counts the number of ones in a bit stream is used as the low-pass filter. The counter does not have such a steep cutoff. The frequency response of the counter is similar to the frequency response of a moving average filter. The residual quantization noise power after the low-pass filter is $1/N_F^2$ of the total quantization noise power.

The increase $\Delta ENOB_1$ of the effective number of bits in this case is given by Formula (18).

$$\Delta ENOB_1 = \log_2 N_F \text{[bit]} \quad (18)$$

In an actual circuit, $N_F = 64$ (or 66 for error reduction) and a counter-based low-pass filter are used. The increase in ENOB in the F measurement circuit is 6 bits. From Formula (18), when the oversampling ratio $N_F$ is doubled, the processing time for the C measurement is doubled. On the other hand, ENOB can be increased by 1 bit.

$N_F = 64$ strictly corresponds to the TD conversion in a 6-bit F measurement. This may deteriorate depth resolution at the connection boundary of the conversion code for the C measurement and the F measurement. This is because, in the characteristic of linearity, discontinuous steps appear at a boundary of a maximum $\Delta TOF$. A time variable error occurs at the discontinuity point. At the singular point, the distance resolution (depth noise) deteriorates. The deterioration of the distance resolution at the singular point can be avoided by setting $N_F$ to a value exceeding 64 that is the factorial of 2. The deterioration of the distance resolution at the singular point can be avoided by, for example, setting $N_F = 66$.

FIG. 12 is a timing chart collectively showing the C measurement and the F measurement. That is, FIG. 12 shows a conceptual driving waveform of a technology for measuring the light flight time (TOF) by the C measurement and the F measurement. The distance image capturing device 1 first performs the C measurement. In the C measurement, the DT converter 50 of the distance image capturing device 1 generates $\Delta t_D \cdot n_C$ as the estimated value of the light flight time. The distance image capturing device 1 performs the F measurement next. In the F measurement, the distance image capturing device 1 operates as a Delta Sigma modulator. As a result, the DT converter 50 of the distance image capturing device 1 outputs a signal that is a bit stream waveform. The bit stream waveform includes two states: $\Delta t_D \cdot n_C$ and $\Delta t_D \cdot (n_C - 1)$. The output value of the Delta Sigma modulator F10 is output to a low-pass filter. As a result of downsampling the data, a $Y_{fine}$ is obtained as the output value of the F measurement. FIG. 12 shows a state of a filter output when a digital counter (first-order integrator) is used for the decimation filter.

The $Y_{fine}$, which is the output value of the F measurement, is represented by Formula (19). The $Y_{fine}$ takes a value between 0 and 1.

$$Y_{fine} = n_F / N_F \quad (19)$$

$Y_{fine}$: an output value of the F measurement.
$n_F$: a number that is output from the Delta Sigma modulator F10.
$N_F$: a total number of samples taken in the F measurement.

According to the technology of light flight time measurement including the C measurement and the F measurement, an output value $Y_{TOF}$ indicating the light flight time is represented by Formula (20) or Formula (21).

$$Y_{TOF} = Y_{coarse} + Y_{fine} - 1 \quad (20)$$

$$Y_{TOF} = n_C + n_F / N_F - 1 \quad (21)$$

Assuming $N_C$ and $N_F$ are $2M_C$ and $2M_F$, the technology of light flight time measurement including the C measurement and the F measurement can convert the light flight time (TOF) into the digital code of $(m_C+m_F)$ bits.

Hereinafter, a specific circuit configuration of the distance image capturing device 1 will be described. FIGS. 13 and 14 show a circuit configuration of the pixel circuit unit 10, a pixel 121, and a front stage amplifier 122. The pixel circuit unit 10 has the photodiode 11 (photoelectric conversion unit) and the demodulator 12. The photodiode 11 receives the reflected light L2 from the target object 100. The pixel 121 outputs the first charge amount $Q_1$ and the second charge amount $Q_2$ to the front stage amplifier 122.

The photodiode 11 outputs the generated charge to the demodulator 12. The photodiode 11 is connected to a reference potential VRef.

The demodulator 12 has the first floating diffusion unit $FD_1$ (first charge readout area), the first transfer control gate $G_1$ (first control electrode), the second floating diffusion unit $FD_2$ (second charge readout area), the second transfer control gate $G_2$ (second control electrode), a voltage source $V_D$, and a third transfer control gate $G_D$. The demodulator 12 receives the charge from the photodiode 11. The demodulator 12 outputs the first front stage voltage signal $V_{P1}$ and the second front stage voltage signal $V_{P2}$ to the analog processing unit 20.

The output of the photodiode 11 is connected to the first transfer control gate $G_1$, the second transfer control gate $G_2$, and the third transfer control gate $G_D$. The first transfer control gate $G_1$ and the second transfer control gate $G_2$ are gates based on the principle of lateral electric field-controlled charge modulator (LEFM). By adopting a lateral electric field-controlled charge modulator gate, it is possible to switch between allowing and disallowing the transfer of the first charge amount $Q_1$ from the photodiode 11 to the first floating diffusion unit $FD_1$ at an extremely high speed. For example, the switching time is about a sub-nanosecond. As a result, the resolution of distance measurement can be increased.

The first transfer control gate $G_1$ is connected to the first floating diffusion unit $FD_1$. Therefore, the first transfer control gate $G_1$ is disposed between the photodiode 11 and the first floating diffusion unit $FD_1$. The first transfer control gate $G_1$ allows the transfer of the charge from the photodiode 11 to the first floating diffusion unit $FD_1$. The first transfer control gate $G_1$ disallows the transfer of the charge from the photodiode 11 to the first floating diffusion unit $FD_1$. The allowing and disallowing of the transfer are switched according to the voltage of the control signal given to the first transfer control gate $G_1$. When the voltage of the control signal given to the first transfer control gate $G_1$ is a so-called "HIGH", the first transfer control gate $G_1$ allows the transfer of the charge from the photodiode 11 to the first floating diffusion unit $FD_1$. When the voltage of the control signal given to the first transfer control gate $G_1$ is a so-called "LOW", the first transfer control gate $G_1$ disallows the transfer of the charge from the photodiode 11 to the first floating diffusion unit $FD_1$. The first floating diffusion unit $FD_1$ is connected to the first input end of the front stage amplifier 122. The first floating diffusion unit $FD_1$ accumulates the charge transferred from the photodiode 11 as the first charge.

The connection configuration of the second transfer control gate $G_2$ and the second floating diffusion unit $FD_2$ is the same as the connection configuration of the first transfer control gate $G_1$ and the first floating diffusion unit $FD_1$. Therefore, a detailed description thereof will be omitted.

The third transfer control gate $G_D$ is a MOS transistor gate. The drain of the MOS transistor is connected to the voltage source $V_D$. Therefore, the third transfer control gate $G_D$ is disposed between the photodiode 11 and the voltage source $V_D$. The third transfer control gate $G_D$ allows the transfer of the charge from the photodiode 11 to the drain when a control signal corresponding to HIGH is given. The charge is discharged to the drain. The third transfer control gate $G_D$ disallows the transfer of the charge from the photodiode 11 to the drain when a control signal corresponding to LOW is given.

The front stage amplifier 122 is a fully differential charge-sensitive amplifier (CSA). The front stage amplifier 122 receives the first charge amount $Q_1$ and the second charge amount $Q_2$ from the pixel 121. The front stage amplifier 122 outputs the first front stage voltage signal VP1 and the second front stage voltage signal $V_{P2}$ to the analog processing unit 20. The front stage amplifier 122 has a calculation amplifier 122S, feedback capacitors CS1 and CS2, and reset switches PR11 and PR12. The front stage amplifier 122 has a first common mode feedback controller 122A.

The calculation amplifier 122S has a first input end, a second input end, and a third input end. The calculation amplifier 122S has a first output end and a second output end.

The first input end is connected to the first floating diffusion unit $FD_1$. The first input end receives the first charge amount $Q_1$ accumulated in the first floating diffusion unit $FD_1$. The first output end is connected to the input end of the analog processing unit 20. The first output end outputs the first front stage voltage signal $V_{P1}$ to the input end of the analog processing unit 20. The first output end is connected to the first common mode feedback controller 122A. The first output end outputs the first front stage voltage signal $V_{P1}$ to the first common mode feedback controller 122A.

The connection configuration of the second input end and the second output end is the same as the connection configuration of the first input end and the first output end. Therefore, a detailed description thereof will be omitted.

The third input end is connected to the first common mode feedback controller 122A. The third input end receives a control signal from the first common mode feedback controller 122A. The first common mode feedback controller 122A controls the calculation amplifier 122S such that the average level of the fully differential output is equal to a common voltage $V_{COM}$.

The feedback capacitor $C_{S1}$ is connected between the first input end and the first output end. The reset switch $P_{R11}$ is connected between the first input end and the first output end. The reset switch $P_{R11}$ is electrically connected in parallel with the feedback capacitor $C_{S1}$.

The first front stage voltage signal $V_{P1}$ of the front stage amplifier 122 is represented by Formula (22). The second front stage voltage signal $V_{P2}$ of the front stage amplifier 122 is represented by Formula (23).

$$V_{P1} \cong \frac{Q_1 - Q_2}{2C_S} + V_{COM} \tag{22}$$

$$V_{P2} \cong \frac{Q_2 - Q_1}{2C_S} + V_{COM} \tag{23}$$

$V_{P1}$: a first front stage voltage signal.
$V_{P2}$: a second front stage voltage signal.
$Q_1$: a first charge amount accumulated in the first floating diffusion unit FD1.

$Q_2$: a second charge amount accumulated in the second floating diffusion unit FD2.

$C_S$: capacitance values of the feedback capacitor $C_{S1}$ and the feedback capacitor $C_{S2}$.

$V_{COM}$: a reference voltage.

The first charge amount $Q_1$ is represented by Formula (24). The second charge amount $Q_2$ is represented by Formula (25).

$$Q_1 \cong Q_{S1} + Q_B \tag{24}$$

$$Q_2 \cong Q_{S2} + Q_B \tag{25}$$

$Q_{S1}$: a signal charge amount attributed to the reflected light in the first charge amount $Q_1$.

$Q_{S2}$: a signal charge amount attributed to the reflected light in the second charge amount $Q_2$.

$Q_B$: a noise charge amount attributed to background light in the first charge amount $Q_1$ and the second charge amount $Q_2$.

By using a fully differential amplifier with common mode feedback, the differential front stage voltage signal $\Delta V_P$ is represented by Formula (26). According to Formula (26), the differential front stage voltage signal $\Delta V_P$, which is the output value of the front stage amplifier 122, cancels the background light component ($Q_B$). The differential front stage voltage signal $\Delta V_P$ is proportional to the difference between the signal charge amount $Q_{S1}$ and the signal charge amount $Q_{S2}$.

$$\Delta V_P = V_{P1} - V_{P2} \cong \frac{Q_{S1} - Q_{S2}}{C_S} \tag{26}$$

$\Delta V_P$: a differential front stage voltage signal.

$V_{P1}$: a first front stage voltage signal.

$V_{P2}$: a second front stage voltage signal.

$Q_{S1}$: a signal charge amount attributed to the reflected light in the first charge amount $Q_1$.

$Q_{S2}$: a signal charge amount attributed to the reflected light in the second charge amount $Q_2$.

$C_S$: capacitance values of the feedback capacitor $C_{S1}$ and the feedback capacitor $C_{S2}$.

A charge-voltage conversion gain $G_C$ is represented by Formula (27).

$$G_C \cong \frac{\Delta V_P}{Q_{S1} - Q_{S2}} = \frac{1}{C_S} \tag{27}$$

$G_C$: a charge-voltage conversion gain.

$\Delta V_P$: a differential front stage voltage signal.

$Q_{S1}$: a signal charge amount attributed to the reflected light in the first charge amount $Q_1$.

$Q_{S2}$: a signal charge amount attributed to the reflected light in the second charge amount $Q_2$.

$C_S$: capacitance values of the feedback capacitor $C_{S1}$ and the feedback capacitor $C_{S2}$.

The number of photons included in one short pulse light is small. Therefore, the signal is enhanced by periodically receiving the reflected light in many cycles.

FIG. 15 is a timing chart showing operations of the pixel circuit unit 10 and the demodulator 12. FIG. 15 shows the movement of the differential front stage voltage signal $\Delta V_P$ with respect to three types of relative delay time signals $t_D$. When the relative delay time signal $T_D$ is 0 and the signal charge amount $Q_{S1}$ and the signal charge amount $Q_{S2}$ are equal, the differential front stage voltage signal $\Delta V_P$ is 0. When the relative delay time signal $t_D$ is greater than 0 ($t_D > 0$), the absolute value of the differential front stage voltage signal $\Delta V_P$ gradually increases. In this case, the sign is positive. When the relative delay time signal $T_D$ is smaller than 0 ($t_D < 0$), the absolute value of the differential front stage voltage signal $\Delta V_P$ gradually increases. In this case, the sign is negative. Therefore, it is possible to measure the relative optical pulse delay by the light flight time. That is, the demodulator 12 including the charge-sensitive front stage amplifier 122 can be adopted for the measurement of the optical pulse delay.

FIG. 16 shows a circuit configuration of the analog processing unit 20. The analog processing unit 20 receives the first front stage voltage signal $V_{P1}$ and the second front stage voltage signal $V_{P2}$ from the front stage amplifier 122. The analog processing unit 20 outputs the first subsequent stage voltage signal $V_{O1}$ and the second subsequent stage voltage signal $V_{O2}$ to the A/D converter 30. The analog processing unit 20 has a pre-processing unit 23 and a subsequent stage amplification unit 24.

The pre-processing unit 23 has input capacitors $C_{I1}$ and $C_{I2}$, input switches $P_{S1}$ and $P_{S2}$, and drain switches $P_{R1D1}$ and $P_{R1D2}$. The input capacitors $C_{I1}$ and $C_{I2}$ are connected to the output end of the front stage amplifier 122. The input capacitors $C_{I1}$ and $C_{I2}$ are connected to the input switches $P_{S1}$ and $P_{S2}$ and the drain switches $P_{R1D1}$ and $P_{R1D2}$. The input switches $P_{S1}$ and $P_{S2}$ are connected to the input capacitors $C_{I2}$ and $C_{I2}$ and the input end of a calculation amplifier 20S of the subsequent stage amplification unit 24. The drain switches $P_{R1D1}$ and $P_{R1D2}$ are connected to the input capacitors $C_{I1}$ and $C_{I2}$ and the reference potential $V_{ref}$.

The subsequent stage amplification unit 24 has the calculation amplifier 20S, a feedback capacitor $C_{F1}$, a feedback capacitor $C_{F2}$, reset switches $P_{R21}$ and $P_{R22}$, and a second common mode feedback controller 20A (common mode feedback control unit). The circuit configuration of the subsequent stage amplification unit 24 is the same as the circuit configuration of the front stage amplifier 122. Therefore, detailed description of the connection of elements constituting the subsequent stage amplification unit 24 will be omitted.

As described above, the analog processing unit 20 functions as the buffer 21 when the C measurement is performed. The analog processing unit 20 functions as the integrator 22 when the F measurement is performed. The analog processing unit 20 realizes each operation by controlling the input switches $P_{S1}$ and $P_{S2}$, the drain switches $P_{R1D1}$ and $P_{R1D2}$, and the reset switches $P_{R21}$ and $P_{R22}$.

The operation of the analog processing unit 20 to function as the buffer 21 will be described. According to the operation, the analog processing unit 20 can be regarded as a fixed gain amplifier. When functioning as the buffer 21, the analog processing unit 20 takes two modes of operation.

In the first operation mode, the drain switches $P_{R1D1}$ and $P_{R1D2}$ are turned on. As a result, the differential front stage voltage signal $\Delta V_P$ is sampled in the input capacitors $C_{I1}$ and $C_{I2}$. During the time, the reset switches $P_{R21}$ and $P_{R22}$ are turned on. As a result, the feedback capacitor $C_{F1}$ and the feedback capacitor $C_{F2}$ are reset.

In the second operation mode, the drain switches $P_{R1D1}$ and $P_{R1D2}$ are turned off. Furthermore, the input switches $P_{S1}$ and $P_{S2}$ are turned on. As a result, the charges sampled in the input capacitors $C_{I1}$ and $C_{I2}$ are transferred to the feedback capacitors $C_{F1}$ and $C_{F2}$ so that the input signal is amplified in a capacitance ratio ($C_I/C_F$). The reset switches $P_{R21}$ and $P_{R22}$ are turned off. The input switches $P_{S1}$ and $P_{S2}$ are turned on. As a result, the charges sampled in the input capacitors $C_{I1}$ and $C_{I2}$ are transferred to the feedback capacitors $C_{F1}$ and $C_{F2}$ so that the input signal is amplified in a capacitance ratio ($C_I/C_F$).

A gain AI of the buffer 21 is represented by Formula (28). The gain of the buffer 21 is the gain of the differential output with respect to the differential input.

$$A_I = \frac{\Delta V_O}{\Delta V_P} = \frac{C_I}{C_F} \qquad (28)$$

$A_I$: a gain of the buffer 21.
$\Delta V_O$: a differential front stage voltage signal.
$\Delta V_P$: a differential subsequent stage voltage signal.
$C_I$: capacitance values of the input capacitor $C_{I1}$ and the input capacitor $C_{I2}$.
$C_F$: capacitance values of the feedback capacitor $C_{F1}$ and the feedback capacitors $C_{F2}$.

The operation of the analog processing unit 20 to function as the integrator 22 will be described. According to the operation, the analog processing unit 20 can be regarded as a fully differential switched capacitor integrator. In the operation mode, the reset switches $P_{R21}$ and $P_{R22}$ are turned on to reset the charges of the feedback capacitors $C_{F1}$ and the feedback capacitors $C_{F2}$.

Sampling of the input signal by the input capacitors $C_{I1}$ and $C_{I2}$ and the drain switches $P_{R1D1}$ and $P_{R1D2}$, and the transfer of the charges to the feedback capacitors $C_{F1}$ and the feedback capacitors $C_{F2}$ by the input switches $P_{S1}$ and $P_{S2}$ are repeated to perform switched capacitor integration. The integrator 22 adds the m-th differential front stage voltage signal $\Delta V_P$ to the (m−1)-th integration result each time the loop is repeated. The final output after the repetition of the switched capacitor integration $N_F$ times is represented by Formula (29). That is, the differential subsequent stage voltage signal $\Delta V_O$ ($N_F$) (calculated value) is represented by Formula (29).

$$\Delta V_O(N_F) \cong A_I \sum_{i=1}^{N_F} \Delta V_P(i) \qquad (29)$$

$\Delta V_O$ ($N_F$): an $N_F$-th differential subsequent stage voltage signal.
$A_I$: a gain of the buffer 21.
$\Delta V_P$ (i): an i-th differential input.

FIG. 17 shows a circuit configuration of the DT converter 50 and the transfer control pulse generator 70. The DT converter 50 receives the digital signal $D_M$ from the digital processing unit 40. The DT converter 50 receives a signal $T_S$ from an optical trigger controller 84a. The DT converter 50 starts an operation with the signal $T_S$ as a trigger.

The DT converter 50 has a first delay line 51a, a second delay line 51b, a third delay line 51c, a first digital comparator 52a, a second digital comparator 52b, and a third digital comparator 52c. The first delay line 51a, the second delay line 51b, and the third delay line 51c are delay circuits that can be digitally controlled.

The first delay line 51a is connected to the optical trigger controller 84a (see FIG. 18). The first delay line 51a receives the signal $T_S$ from the optical trigger controller 84a. The first delay line 51a is connected to an input end of the second delay line 51b. The second delay line 51b is connected to an input end of the third delay line 51c. The first delay line 51a, the second delay line 51b, and the third delay line 51c are electrically connected in series. Each of the first delay line 51a, the second delay line 51b, and the third delay line 51c has a 5-bit counter.

The first delay line 51a outputs the first binary counting code to the first digital comparator 52a. The first digital comparator 52a compares the first binary counting code with the digital signal $D_M$ of the digital processing unit 40. The first digital comparator 52a outputs the comparison result as a signal DCO0 to the transfer control pulse generator 70. The signal DCO0 is for the first transfer control pulse $SG_1$ given to the first transfer control gate $G_1$.

The connection configuration and operation of the second delay line 51b and the second digital comparator 52b are the same as the connection configuration and operation of the first delay line 51a and the first digital comparator 52a. Therefore, a detailed description thereof will be omitted.

The connection configuration and operation of the third delay line 51c and the third digital comparator 52c are the same as the connection configuration and operation of the first delay line 51a and the first digital comparator 52a. Therefore, a detailed description thereof will be omitted.

The transfer control pulse generator 70 receives signals DCO0, DCO1, and DCO2 from the DT converter 50. The transfer control pulse generator 70 outputs the first transfer control pulse $SG_1$, the second transfer control pulse $SG_2$, and the third transfer control pulse $SG_D$ to the demodulator 12. The transfer control pulse generator 70 has a first logic element 71a, a second logic element 71b, a third logic element 71c, a first element 72a, a second element 72b, and a third element 72c.

The first logic element 71a is an AND circuit. The first digital comparator 52a is connected to a non-inversion input end of the first logic element 71a. The second digital comparator 52b is connected to an inversion input end of the first logic element 71a. The first element 72a is connected to an output end of the first logic element 71a. The first element 72a outputs the first transfer control pulse $SG_1$ to the demodulator 12.

The second logic element 71b is also an AND circuit. The second digital comparator 52b is connected to a non-inversion input end of the second logic element 71b. The third digital comparator 52c is connected to an inversion input end of the second logic element 71b. The second element 72b is connected to an output end of the second logic element 71b. The second element 72b outputs the second transfer control pulse $SG_2$ to the demodulator 12.

The third logic element 71c is an OR circuit. The third digital comparator 52c is connected to a non-inversion input end of the third logic element 71c. The first digital comparator 52a is connected to an inversion input end of the third logic element 71c. The third element 72c is connected to an output end of the third logic element 71c. The third element 72c outputs the third transfer control pulse $SG_D$ to the demodulator 12.

As shown in FIG. 18, the distance image capturing device 1 has the light source 2, a chip component 83, and an FPGA 84. The chip component 83 and the FPGA 84 are disposed on a printed circuit board 81. A comparator 85 is also disposed on the printed circuit board 81. The printed circuit board 81 has a JTAG interface that outputs a signal output by the chip component 83 to the outside. The printed circuit board 81 outputs a signal output by the chip component 83 to a computer 200 via the JTAG interface.

The chip component 83 includes a digital delay line 51, a digital comparator 52, the transfer control pulse generator 70, the photodiode 11, the demodulator 12, the front stage amplifier 122, the analog processing unit 20, and a multiplexer 83a.

The chip component 83 receives various control signals from the FPGA 84. The chip component 83 receives the reflected light L2 from the target object 100. The analog processing unit 20 of the chip component 83 is connected to the comparator 85 via a multiplex channel. The chip component 83 outputs the first subsequent stage voltage signal $V_{O1}$ and the second subsequent stage voltage signal $V_{O2}$ to the comparator 85.

The comparator 85 generates a bit stream signal based on the first subsequent stage voltage signal $V_{O1}$ and the second subsequent stage voltage signal $V_{O2}$. The comparator 85 outputs the bit stream signal to the FPGA 84.

The FPGA 84 includes the optical trigger controller 84a, the digital processing unit 40, and a lead-out controller 84b. The FPGA 84 receives the digital signal $D_{FB}$, which is a bit stream signal, from the comparator 85. The FPGA 84 outputs a signal to the chip component 83. Specifically, the optical trigger controller 84a outputs a signal TL to a digital delay controller 82. The optical trigger controller 84a outputs the signal TS to the digital delay line 51 of the chip component 83. The digital processing unit 40 has the counter 41, the adder 42, and the decimation filter 60. The digital processing unit outputs the digital signal $D_M$ to the digital delay line 51. The lead-out controller 84b outputs a clock signal PC[n] to the front stage amplifier 122, the analog processing unit 20, and the multiplexer 83a.

Hereinafter, problems of the distance image measurement device in related art will be described in detail. After that, the action and effect of the distance image capturing device 1 of the embodiment will be described.

The distance image measurement device includes a device referred to as a direct type and a device referred to as an indirect type. The direct type device directly measures the time taken from emitting the irradiation light to receiving the reflected light. On the other hand, in the indirect type device, the charges generated due to the reflected light are distributed to two or more areas (tap) every time. The distribution of charges is also referred to as demodulation. The indirect type device obtains the light flight time based on the ratio of the amounts of charges distributed to each area.

The distance image capturing device 1 is required to have high precision, accuracy, linearity, and resistance to ambient light. Usually, the direct type device adopts a single photon avalanche diode (SPAD) as an element for measuring an optical signal. A direct type device using the SPAD and processing in the entire digital domain is suitable for highly accurate light flight time measurement. In the direct type device, the light flight time is digitalized by a time-to-digital (TD) converter. The direct type device equipped with the TD converter has high resolution and good linearity. However, in the direct type device, the circuit scale increases. Furthermore, in the direct type device, the resolution of the TD converter limits the distance resolution. Therefore, with the direct type device, it is difficult to perform short-distance measurement. In a case where extremely high resolution and resistance to ambient light are required for the direct type device, the hardware configuration of the direct type device is complicated.

On the other hand, the indirect type device adopts a pixel with two or more charge accumulation areas. A pixel having two or more charge accumulation areas is also referred to as a lock-in pixel. The indirect type device demodulates the light charge signal by synchronization (lock-in) with the light emitting trigger pulse signal. Next, the indirect type device converts the demodulated light charge signal into a digital signal by the A/D converter. Next, the indirect type device obtains the ratio of the charge amount in the first charge accumulation area and the charge amount in the second charge accumulation area. Then, the indirect type device calculates the distance based on the ratio of the charge amount.

The resolution and linearity in the indirect type device depend on the system response of the light charge demodulator and the A/D converter. The resolution and linearity of the indirect type device are lower than the resolution and linearity of the direct type device. However, the indirect type device is advantageous over the direct type device in that the pixel size is small and the circuit is not complicated. In particular, the indirect type device is more advantageous than the direct type device in that the relatively reliable distance resolution for distance measurement of several meters can be obtained.

The indirect type device is further classified into two types according to the waveform of the modulated light. The waveform of the light is firstly continuous wave (CW). The waveform of the light is secondly a short pulse wave. An indirect type device that uses a short pulse wave concentrates the power of the irradiation light on a short pulse wave. As a result, the charge discharging function of the pixel reduces the influence of ambient light. Therefore, the indirect type device that uses a short pulse wave has high resistance to ambient light.

However, the indirect type device that uses a short pulse wave has a problem of the nonlinearity of a pixel source follower amplifier and a problem of the distortion of the waveform of an optical pulse, which are attributed to the processing in the analog domain when the light flight time is measured. The indirect type device that uses a short pulse wave also has a problem that an optical carrier response time is finite inside the photodiode and a problem of the distortion of a transfer control pulse for demodulation. The indirect type device that uses a short pulse wave has a problem of analogic imperfection.

For example, when the problem that photon shot noise limits the distance resolution is considered, the full-well capacity of a pixel limits the distance resolution in the indirect type device. In addition, the full-well capacity of the pixel limits depth noise in the indirect type device.

In the indirect type device that uses a short pulse wave, using extremely short pulse light is effective for improving the distance resolution. For example, a sensor using an optical pulse of 100 picoseconds or less is reported. The report states that a sensor using an optical pulse of 100 picoseconds or less has the distance resolution of sub-100 μm. However, the problem of nonlinearity attributed to short pulse light, the problem of skew of the transfer control pulse, or the like still remains a problem. The indirect type device that uses a short pulse wave requires complex off-line processing to correct nonlinearity. An on-chip skew correction circuit is also required for the indirect type device that uses a short pulse wave.

In the system response of the indirect type device, the transfer function of the demodulator and the transfer function of the A/D converter limit resolution and linearity. In practice, the system response of the indirect type device has an offset and a nonlinear coefficient. The offset can be easily corrected. However, it is not easy to remove the nonlinear coefficient from the system response. A large-scale processing circuit is required to correct the nonlinear coefficient. Complex signal processing is required to correct the nonlinear coefficient.

The distance image measurement device 1 of the embodiment converts a calculated value obtained from a difference in the charge amount related to the light flight time into a digital signal based on a predetermined condition. Then, the timing of the transfer control pulse is controlled by using the digital signal. As a result, since it is possible to reduce the bias of the charge amount for each charge readout area, the comprehensive performance is improved.

Since the distance image capturing device 1 of the present embodiment performs the measurement in a state where the charge amounts of the two charge accumulation units are both large, it is possible to minimize the influence of noise associated with the accumulation of charges or the readout of the charges. Furthermore, in the Fine measurement, by applying the Delta Sigma modulation technology, the quantization error in a low frequency area decreases. On the other hand, the quantization error in a high frequency area increases. Therefore, a low-pass filter is provided in the subsequent stage. As a result, the reduction of the quantization error can be effectively performed.

The distance image capturing device has been described in detail above based on the embodiment. However, the distance image capturing device is not limited to the above embodiment. The distance image capturing device can be variously deformed within a range that does not deviate from the gist thereof.

The above-described distance image capturing device operates while switching is made between the C measurement and the F measurement. For example, the distance image capturing device may perform either the C measurement or the F measurement. That is, the distance image capturing device may perform only the C measurement for obtaining approximate distance information. In this case, the distance image capturing device may omit the circuit configuration for the F measurement. Furthermore, the distance image capturing device that performs only the C measurement may perform an operation using two different unit delay times. That is, the distance image capturing device performs an operation based on the first unit delay time and an operation based on the second unit delay time shorter than the first delay time. According to such an operation, the operation based on the second unit delay time can be also regarded as the pseudo F measurement.

The distance image capturing device may perform only the F measurement. In this case, the distance image capturing device may omit the circuit configuration for the C measurement.

What is claimed is:

1. A distance image capturing device comprising:
a light source configured to generate pulse light;
a pixel circuitry array that includes a plurality of pixel circuits configured to generate a charge corresponding to received light; and
a peripheral circuit configured to provide the pixel circuitry array with a transfer control pulse that controls an operation of the pixel circuitry array,
wherein each pixel circuit of the plurality of pixel circuits includes
a photoelectric conversion area for converting light into the charge,
a first charge readout area for accumulating the charge transferred from the photoelectric conversion area as a first charge,
a first control electrode that receives a first transfer control pulse that controls transfer of the charge from the photoelectric conversion area to the first charge readout area,
a second charge readout area for accumulating the charge transferred from the photoelectric conversion area as a second charge, and
a second control electrode that receives a second transfer control pulse that controls transfer of the charge from the photoelectric conversion area to the second charge readout area,
wherein the peripheral circuit
generates the first transfer control pulse and the second transfer control pulse based on a magnitude relationship between an amount of the first charge accumulated in the first charge readout area and an amount of the second charge accumulated in the second charge readout area, and
further includes
a first calculating circuitry that outputs a calculated value related to a difference between a first voltage based on the first charge and a second voltage based on the second charge, and
a second calculating circuitry that determines a delay time for determining a timing to output the first transfer control pulse and the second transfer control pulse by using the calculated value, such that the peripheral circuit repeats an accumulation operation of accumulating the first charge and the second charge, an operation of the first calculating circuitry, and an operation of the second calculating circuitry.

2. The distance image capturing device according to claim 1,
wherein in an n-th (n is an integer of 1 or more) operation of the second calculating circuitry, the second calculating circuitry determines, when the calculated value is first information, a delay time further delayed by a unit delay time from an n-th delay time used for an n-th accumulation operation as an (n+1)-th delay time used for an (n+1)-th accumulation operation.

3. The distance image capturing device according to claim 1,
wherein the second calculating circuitry includes
a counter that performs an operation of adding 1 to a control variable when the calculated value is first information in an n-th operation of the second calculating circuitry, and
a delay time determining circuitry that determines a value obtained by multiplying the control variable by a unit delay time as an (n+1)-th delay time used for an (n+1)-th accumulation operation.

4. The distance image capturing device according to claim 3,
wherein the first calculating circuitry includes a differential amplifier that outputs the difference between the first voltage and the second voltage as a differential voltage, and
the differential amplifier includes
a calculation amplifier including a first input end, a second input end, a third input end, a first output end, and a second output end,
a feedback capacitor that receives the first charge from the first charge readout area and is connected to the first input end and the first output end,
a feedback capacitor that receives the second charge from the second charge readout area and is connected to the second input end and the second output end, and
a common mode feedback controller that is connected to the third input end, the first output end, and the second output end and provides a signal to the third input end such that a difference between an output value from the first output end and an output value from the second output end is equal to a common voltage.

5. The distance image capturing device according to claim 1,
wherein the first calculating circuitry outputs the difference between the first voltage and the second voltage as a differential voltage, and then obtains, as an integrated value of an m-th differential voltage, a result obtained by adding the m-th differential voltage to an integrated value of first to (m−1)-th (m is an integer of 2 or more) differential voltages, and
the second calculating circuitry determines, when an m-th integrated value is second information, an (m+1)-th delay time used for an (m+1)-th accumulation operation as a first delay time, and, when the m-th integrated value is first information, the (m+1)-th delay time as a second delay time.

6. The distance image capturing device according to claim 1,
wherein the first calculating circuitry includes an integrator that obtains, as an m-th integrated value, a result obtained by adding an m-th differential voltage to an integrated value of first to (m−1)-th differential voltages, and
the second calculating circuitry includes a delay time determining circuit that determines, when the m-th integrated value is second information, a first delay time as an (m+1)-th delay time and determines, and, when the m-th integrated value is first information, a second delay time as the (m+1)-th delay time.

7. The distance image capturing device according to claim 5, further comprising:
an A/D converter configured to convert the calculated value output by the first calculating circuitry into a digital signal, output the digital signal to the second calculating circuitry, and constitute a Delta Sigma modulator in cooperation with the first calculating circuitry and the second calculating circuitry; and
a decimation filter configured to, each time the accumulation operation, the operation of the first calculating circuitry, the operation of the A/D converter, and an operation of the second calculating circuitry are repeated, receive the digital signal output by the A/D converter and perform low-pass filter processing and downsampling on the digital signal.

8. The distance image capturing device according to claim 7,
wherein the decimation filter has an oversampling ratio of the low-pass filter processing, which is an integer greater than 2B−1 and smaller than 2B, and
B is a minimum number of bits which can represent an oversampling ratio.

9. The distance image capturing device according to claim 1,
wherein the peripheral circuit performs
a first measurement that repeats processing including the accumulation operation of accumulating the first charge and the second charge, and an operation in which, in an n-th operation of the second calculating circuitry, the second calculating circuitry determines, when the calculated value is first information, a delay time further delayed by a unit delay time from an n-th delay time used for an n-th accumulation operation as an (n+1)-th delay time used for an (n+1)-th accumulation operation, and
a second measurement that repeats processing including the accumulation operation, an operation in which the first calculating circuitry outputs the difference between the first voltage and the second voltage as a differential voltage, and then obtains, as an integrated value of an m-th differential voltage, a result obtained by adding the m-th differential voltage to an integrated value of first to (m−1)-th differential voltages, and an operation in which the second calculating circuitry determines, when an m-th integrated value is second information, a first delay time as an (m+1)-th delay time and determines, and, when the m-th integrated value is first information, a second delay time as the (m+1)-th delay time.

10. The distance image capturing device according to claim 1,
wherein the first calculating circuitry includes an integrator that obtains a result obtained by adding an m-th differential voltage to an integrated value of a first to (m−1)-th differential voltages, and
the second calculating circuitry includes
a counter that performs an operation of adding 1 to a control variable when the calculated value is first information in an n-th operation of the second calculating circuitry, and
a delay time determining circuitry that selectively executes an operation of determining a value obtained by multiplying the control variable by a unit delay time as an (n+1)-th delay time used for an (n+1)-th accumulation operation, or an operation of determining, when an m-th integrated value is second information, a first delay time as an (m+1)-th delay time and determining, and, when the m-th integrated value is first information, a second delay time as the (m+1)-th delay time.

11. A method of capturing a distance image by using a distance image capturing device,
the distance image capturing device including
a photoelectric conversion area that converts light into a charge,
a first charge readout area that accumulates the charge transferred from the photoelectric conversion area as a first charge,
a first control electrode that receives a first transfer control pulse that controls transfer of the charge from the photoelectric conversion area to the first charge readout area,
a second charge readout area that accumulates the charge transferred from the photoelectric conversion area as a second charge, and
a second control electrode that receives a second transfer control pulse that controls transfer of the charge from the photoelectric conversion area to the second charge readout area,
the method comprising:
performing a charge accumulation by accumulating the first charge in the first charge readout area based on the first transfer control pulse given to the first control electrode and accumulating the second charge in the second charge readout area based on the second transfer control pulse given to the second control electrode; and
performing a pulse generation by generating the first transfer control pulse and the second transfer control pulse based on a magnitude relationship between an amount of the first charge and an amount of the second charge, wherein the pulse generation includes
outputting a calculated value related to a difference between a first voltage based on the first charge and a second voltage based on the second charge, and determining a delay time to determine a timing for outputting the first transfer control pulse and the second transfer control pulse by using the calculated value, and the method further includes repeating the charge accumulation and the pulse generation.

12. The method of capturing a distance image according to claim 11, wherein the determining of the delay time includes determining in an n-th calculation, when the calculated value is first information, a delay time further delayed by a unit delay time from an n-th delay time used for an n-th charge accumulation as an (n+1)-th delay time used for an (n+1)-th charge accumulation.

13. The method of capturing a distance image according to claim 11, wherein the delay time determining includes
outputting the difference between the first voltage and the second voltage as a differential voltage, and then obtaining, as an integrated value of an m-th differential voltage, a result obtained by adding the m-th differential voltage to an integrated value of first to (m−1)-th differential voltages, and determining, when an m-th integrated value is second information, an (m+1)-th delay time used for an (m+1)-th charge accumulation as a first delay time, and, when the m-th integrated value is first information, the (m+1)-th delay time as a second delay time.

14. The method of capturing a distance image according to claim 11, wherein the delay time determining includes
determining in an n-th calculation, when the calculated value is first information, a delay time further delayed by a unit delay time from an n-th delay time used for an n-th charge accumulation as an (n+1)-th delay time used for an (n+1)-th charge accumulation, outputting the difference between the first voltage and the second voltage as a differential voltage, and then obtaining, as an integrated value of an m-th differential voltage, a result obtained by adding the m-th differential voltage to an integrated value of first to (m−1)-th differential voltages, and determining, when an m-th integrated value is second information, an (m+1)-th delay time used for an (m+1)-th charge accumulation as a first delay time, and, when the m-th integrated value is first information, the (m+1)-th delay time is set as a second delay time.

* * * * *